(12) United States Patent
Watanabe et al.

(10) Patent No.: US 10,921,638 B2
(45) Date of Patent: Feb. 16, 2021

(54) DISPLAY DEVICE, ELECTRONIC APPARATUS, SEMI-TRANSMISSIVE REFLECTION PLATE, AND ELECTRICAL APPARATUS

(71) Applicant: SHARP KABUSHIKI KAISHA, Sakai (JP)

(72) Inventors: Hisashi Watanabe, Sakai (JP); Akira Sakai, Sakai (JP); Hiroyuki Hakoi, Sakai (JP); Masaki Tabata, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 119 days.

(21) Appl. No.: 16/314,780

(22) PCT Filed: Jun. 29, 2017

(86) PCT No.: PCT/JP2017/023837
§ 371 (c)(1),
(2) Date: Jan. 2, 2019

(87) PCT Pub. No.: WO2018/008498
PCT Pub. Date: Jan. 11, 2018

(65) Prior Publication Data
US 2019/0227378 A1 Jul. 25, 2019

(30) Foreign Application Priority Data
Jul. 6, 2016 (JP) .................................. 2016-134395

(51) Int. Cl.
*G02F 1/13* (2006.01)
*G02F 1/1335* (2006.01)
(Continued)

(52) U.S. Cl.
CPC ........ *G02F 1/133536* (2013.01); *G02B 1/118* (2013.01); *G02B 5/02* (2013.01);
(Continued)

(58) Field of Classification Search
CPC ............. G02F 1/133536; G02F 1/1335; G02F 1/133533; G02F 2201/38; G02B 5/30;
(Continued)

(56) References Cited

U.S. PATENT DOCUMENTS 5,686,979 A 11/1997 Weber et al.
2004/0051827 A1 3/2004 Hinata et al.
(Continued)

FOREIGN PATENT DOCUMENTS

JP H11-508377 A 7/1999
JP 2000-180847 A 6/2000
(Continued)

OTHER PUBLICATIONS

Lino, "Liquid crystal display device and electronic device using the same", JP 2000180847, machine translation (Year: 2000).*
(Continued)

*Primary Examiner* — Wen Huang
(74) *Attorney, Agent, or Firm* — ScienBiziP, P.C.

(57) ABSTRACT

The present invention provides a display device that can display chromatic color(s) and pattern(s) without power consumption in the non-display state (light off state) and an electronic apparatus including the display device. The display device includes a display panel and a transflective reflector disposed on a viewing surface side of the display panel. The transflective reflector includes a reflective polarizer and a color polarizer disposed on a side closer to the viewing surface than the reflective polarizer.

11 Claims, 15 Drawing Sheets

(51) Int. Cl.
*G02B 5/30* (2006.01)
*G02B 1/118* (2015.01)
*G02B 5/02* (2006.01)

(52) U.S. Cl.
CPC ......... *G02B 5/30* (2013.01); *G02F 1/133533* (2013.01); *G02F 2201/38* (2013.01)

(58) Field of Classification Search
CPC ........... G02B 1/111; G02B 1/118; G02B 5/02; G09F 9/00
See application file for complete search history.

(56) References Cited

U.S. PATENT DOCUMENTS

| | | |
|---|---|---|
| 2004/0100598 A1 | 5/2004 | Adachi et al. |
| 2005/0185278 A1 | 8/2005 | Horsten et al. |
| 2006/0159958 A1 | 7/2006 | Lee |
| 2007/0183037 A1 | 8/2007 | De Boer et al. |
| 2008/0285128 A1 | 11/2008 | Nieuwkerk et al. |
| 2016/0026039 A1 | 1/2016 | Sakai et al. |
| 2017/0082895 A1* | 3/2017 | Sakai ................. G02B 5/30 |

FOREIGN PATENT DOCUMENTS

| | | |
|---|---|---|
| JP | 2000-267584 A | 9/2000 |
| JP | 2001-318374 A | 11/2001 |
| JP | 2004-085590 A | 3/2004 |
| JP | 2004-086145 A | 3/2004 |
| JP | 2004-118041 A | 4/2004 |
| JP | 2004-118042 A | 4/2004 |
| JP | 2004-125885 A | 4/2004 |
| JP | 2004-177591 A | 6/2004 |
| JP | 2005-195824 A | 7/2005 |
| JP | 2005-521086 A | 7/2005 |
| JP | 2006-201782 A | 8/2006 |
| JP | 2007-127724 A | 5/2007 |
| JP | 2007-517568 A | 7/2007 |
| JP | 2008-090314 A | 4/2008 |
| WO | 2014/112525 A1 | 7/2014 |
| WO | 2015/141350 A1 | 9/2015 |

OTHER PUBLICATIONS

Akiyama, "Liquid crystal display device", JP 2007127724, machine translation (Year: 2007).*

* cited by examiner

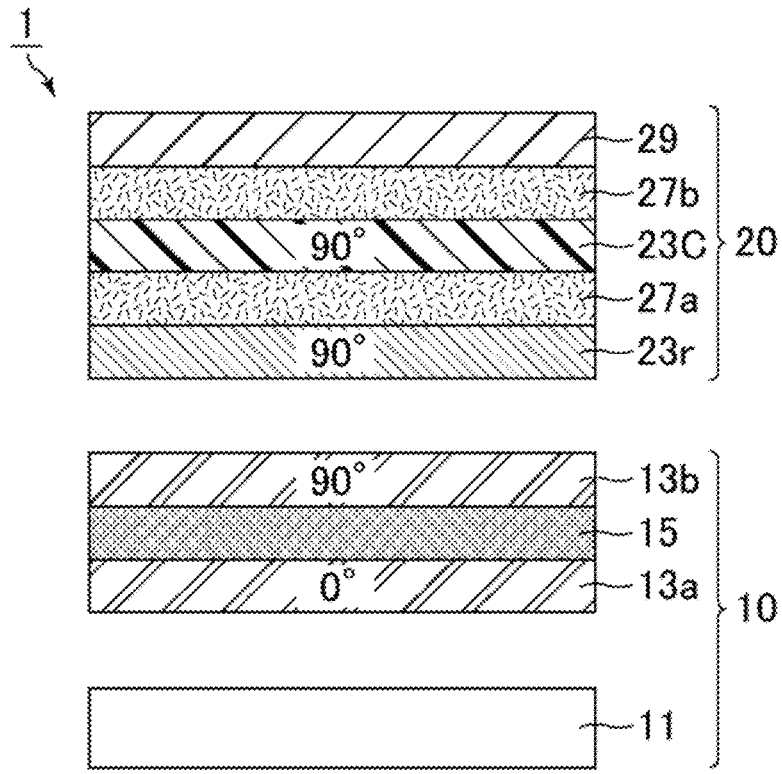
Fig. 1
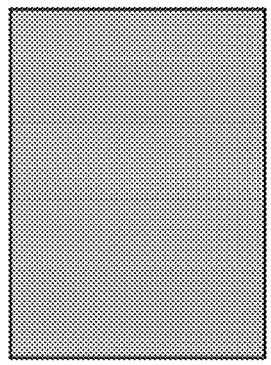
Single color
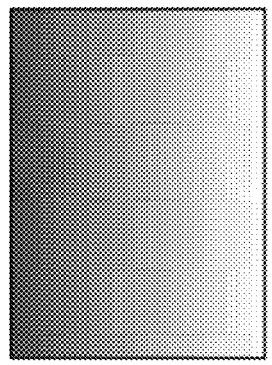
Gradation
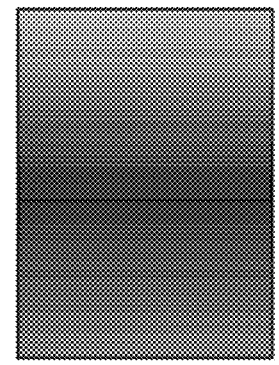
Multiple colors
Fig. 2

DISPLAY DEVICE, ELECTRONIC APPARATUS, SEMI-TRANSMISSIVE REFLECTION PLATE, AND ELECTRICAL APPARATUS

TECHNICAL FIELD

The present invention relates to a display device, an electronic apparatus including the display device, a transflective reflector, and an electrical apparatus including the transflective reflector. The present invention specifically relates to a display device suitably used for applications such as smartphones, monitors, and televisions, an electronic apparatus including the display device, a transflective reflector suitably used for applications such as refrigerators, washing machines, and microwave ovens in addition to the above applications, and an electrical apparatus including the transflective reflector.

BACKGROUND ART

Liquid crystal display panels have a configuration including a pair of glass substrates or the like and a liquid crystal display element sandwiched therebetween. Liquid crystal display panels, utilizing their advantages such as a thin profile, light weight, and low power consumption, are essential to items in daily life and business, such as automotive navigation systems, book readers, digital photo frames, industrial appliances, televisions, personal computers, smartphones, and tablet terminals. Also, organic electroluminescent display panels (hereinafter, also referred to as organic EL display panels) are expected to be practically used in various applications as with the liquid crystal display panels.

In a conventional electronic apparatus including a transmissive liquid crystal display or an organic EL display, an image is displayed in a display region while a region surrounding the display region (frame region), being called a frame or bezel, does not contribute to display. In the power off state of such a display, being of a light emitting type, no image is displayed in the display region and the frame region remains not contributive to display.

Under the current situation, a mirror display has been proposed which includes a transflective reflector on the viewing surface side of the display and thereby can serve as a mirror in the no-display state (e.g., Patent Literatures 1 to 11). A mirror display is usable as a mirror as well as a display that is the original function. Specifically, a mirror display performs display with display light when display light is emitted from a display panel, and reflects external light to serve as a mirror when no display light is emitted from the display panel.

For the transflective reflector, an optical member with a reflective function is used, and known examples thereof include reflective polarizers such as a multilayer reflective polarizer and a wire grid reflective polarizer (e.g., Patent Literatures 12 and 13). The reflective polarizer reflects polarized incident light vibrating in the direction parallel to the reflection axis and transmits polarized incident light vibrating in the direction perpendicular to the reflection axis. Thus, the reflective polarizer can transmit light emitted from a display panel to the viewing surface side as display light and reflect external light vibrating in the direction perpendicular to the polarization direction of the display light to the viewing surface side. A mirror display including the reflective polarizer as a layer of a transflective reflector switches between the display mode (power on state) and the mirror mode (power off state) utilizing such principles.

Additionally, a mirror display has been disclosed which includes not a specular reflection surface but a diffuse reflection surface and thereby can match the surrounding environment in the mirror mode (e.g., Patent Literature 14).

CITATION LIST

Patent Literature

Patent Literature 1: JP 2004-085590 A
Patent Literature 2: JP 2004-125885 A
Patent Literature 3: JP 2004-86145 A
Patent Literature 4: JP 2008-90314 A
Patent Literature 5: JP 2004-177591 A
Patent Literature 6: JP 2004-118041 A
Patent Literature 7: JP 2004-118042 A
Patent Literature 8: JP H11-508377 T
Patent Literature 9: JP 2001-318374 A
Patent Literature 10: JP 2007-517568 T
Patent Literature 11: JP 2005-521086 T
Patent Literature 12: JP 2006-201782 A
Patent Literature 13: JP 2005-195824 A
Patent Literature 14: WO 2015/141350

SUMMARY OF INVENTION

Technical Problem

Conventional electronic apparatuses, excluding those provided with a mirror display, provide only a black display screen in the power off state, which is worthless for users and may deteriorate the designability. In particular, a black screen of a conventional electronic apparatus placed in a bright room appears out of place because the black screen fails to match the interior, walls, and the case of the display device which all have bright base colors. Namely, conventional electronic apparatuses are regarded as being valuable only in the display state. In the current trend where consumer electronics and information equipment with high designability have been receiving the attention, a technique avoiding the provision of a black screen of the display has been required.

One of methods for achieving the technique is to keep the display in the display state all the time. Unfortunately, this method consumes a huge amount of electricity, which inhibits application of the method to mobile terminals, particularly. Another method for achieving the technique is to use a non-light emitting type display such as a reflective LCD and an electrophoretic type display. Unfortunately, such displays are employed for only some mobile terminals and have a defect of being unavailable in dark places. This method is thus not available for all types of displays.

The present invention has been made under the current situation in the art and aims to provide a display device that can display chromatic color(s) and pattern(s) without power consumption in the non-display state (light off state), and an electronic apparatus including the display device.

Solution to Problem

The present inventors made various studies on display devices capable of displaying chromatic color(s) and pattern(s) in the non-display state of the display panel without power consumption and found that application of the techniques for a mirror display described above leads to a display device capable of performing display with display light when display light is emitted from the display panel and displaying chromatic color(s) and pattern(s) by reflecting external light when no display light is emitted from the display panel. The inventors then succeeded in avoiding the provision of a black screen in the non-display state by disposing a transflective reflector on the front surface of the display and allowing the transflective reflector to include a reflective polarizer and a color polarizer disposed on a side closer to the viewing surface than the reflective polarizer. The inventors thereby, successfully solved the problem to arrive at the present invention.

An aspect of the present invention may be a display device including a display panel and a transflective reflector disposed on a viewing surface side of the display panel, the transflective reflector including a reflective polarizer and a color polarizer disposed on a side closer to the viewing surface than the reflective polarizer.

Another aspect of the present invention may be an electronic apparatus including the display device.

Still another aspect of the present invention may be a transflective reflector including a reflective polarizer and a color polarizer.

Still another aspect of the present invention may be an electrical apparatus including: the transflective reflector and a case, the case being a dark room and including lighting inside and a window for attaching the transflective reflector, the color polarizer of the transflective reflector being disposed on a side closer to the viewing surface side than the reflective polarizer.

The following are examples of preferred embodiments of the display device of the present invention. The respective examples may appropriately be combined with each other within the spirit of the present invention.

The display panel in the display device of the present invention includes an absorptive polarizer. The transmission axis of the absorptive polarizer and the transmission axis of the reflective polarizer may be substantially parallel to or substantially perpendicular to each other. The following are configuration examples satisfying this relationship between the transmission axis of the absorptive polarizer and the transmission axis of the reflective polarizer.

In the case where the display panel includes a polarizer (e.g., in the case where an organic EL display panel includes a circular polarizer for antireflection), a configuration in which the transmission axis of the absorptive polarizer in the display panel and the transmission axis of the reflective polarizer are substantially parallel to each other is preferred. In the case where the display panel includes a pair of absorptive polarizers whose transmission axes are perpendicular to each other (e.g., in the case where a liquid crystal display panel includes a pair of absorptive polarizers disposed in crossed Nicols), a configuration in which the transmission axis of the reflective polarizer is substantially parallel to the transmission axis of the absorptive polarizer closer to the transflective reflector (typically, on the viewing surface side) is preferred. In this configuration, the transmission axis of the polarizer farther from the transflective reflector (typically, on the back surface side) is substantially perpendicular to the transmission axis of the reflective polarizer.

Even in the case where display light emitted from the display panel is not polarized light (e.g., in the case where an organic EL display panel with no polarizer is used), the problem can be solved.

In an embodiment of the display device of the present invention, the transflective reflector may include a color polarizer. Preferably, the transflective reflector (i.e., the color polarizer of the transflective reflector) satisfies a proportion of the minimum reflectance to the maximum reflectance in a wavelength band from 400 to 700 nm of 5% or more. The upper limit of this proportion is not particularly limited, and is preferably 96%, for example.

Preferably, the transflective reflector of the display device of the present invention in a plan view has a reflectance and/or a chromaticity changing in one direction in a wavelength band from 400 to 700 nm. Preferably, the transflective reflector has a certain pattern in a plan view. Having a certain pattern means the pattern consists of multiple colors.

Preferably, the transflective reflector of the display device of the present invention further includes a light diffusing layer on a side closer to the viewing surface than the reflective polarizer, and the light diffusing layer is a light diffusing adhesive layer and/or a light diffusion sheet (light diffusing film). Preferably, the light diffusing layer is a polarized light diffusing layer whose diffusion axis is parallel to the reflection axis of the reflective polarizer.

Preferably, the display device of the present invention includes a light-shielding layer in a frame region on a back surface side of the reflective polarizer.

Preferably, the display device of the present invention includes an antireflection film on at least one selected from a back surface of the transflective reflector and a viewing surface of the display panel. Particularly preferably, the antireflection film is disposed on each of the back surface side of the transflective reflector and the viewing surface side of the display panel.

Preferably, the display device of the present invention includes a transparent resin filling a space between the transflective reflector and the display panel.

Preferably, the display device of the present invention includes a reflective layer in a frame region on the back surface side of the reflective polarizer. In the case where a light-shielding layer is disposed in the frame region on the back surface side of the reflective polarizer, for example, a reflective layer may further be disposed between the reflective polarizer and the light-shielding layer. Preferably, the reflective layer has a reflectance in a wavelength band from 400 to 700 nm falling within a range of 1% to 10%.

Preferably, the transflective reflector of the display device of the present invention further includes a switching portion on a side closer to the viewing surface than the reflective polarizer, and the switching portion is configured to be switchable between a state of transmitting light from the viewing surface side of the display device to the display panel and a state of not transmitting light from the viewing surface side of the display device to the display panel. This configuration allows the display device to suitably switch between the on state and the off state of the switching portion in accordance with the power on state and the power off state of the display panel. The on state and the off state of the switching portion will be described later.

The switching portion includes, in the order from the back surface side, a liquid crystal display panel and an absorptive polarizer. The transmission axis of the absorptive polarizer and the transmission axis of the reflective polarizer may be substantially parallel to or substantially perpendicular to each other.

Preferably, the display panel of the display device of the present invention is a liquid crystal display panel or an organic EL display panel. Some organic EL display panels for mobile applications include a circular polarizer for antireflection to achieve improved visibility. The present invention can be particularly appropriately applied to such a, case. In addition, the present invention can be applied to an organic EL display panel without a polarizer, as described. Alternatively, the display panel may be a liquid crystal display panel, for example. The above problem can be solved also in such a case. Also, the display panel may be a 3D compatible display, which allows viewing of three-dimensional (3D) video images.

The following are examples of a preferred embodiment of the electronic apparatus of the present invention. The respective examples may appropriately be combined with each other within the spirit of the present invention.

Preferably, the electronic apparatus of the present invention further includes a chromatic case housing the display device, and the chromatic case and the transflective reflector have a color difference ΔE of 6.5 or less, more preferably 3.2 or less. The color difference ΔE may satisfy the above numerical range in a plan view of the display surface. The lower limit of the color difference ΔE is not particularly limited and may be 0.

The electronic apparatus of the present invention may have, in addition to a function of switching between the display state and the non-display state in the entire screen with time, a function of operating certain region(s) in the display state and the other region(s) in the non-display state simultaneously in the same plane. For example, the display device allows a central portion of the display region to display chromatic color(s) or pattern(s) (no-image display state) and the peripheral portion to be in the image display state, whereby a no-image displayed region may be formed only in the central portion of the display region. Alternatively, the electronic apparatus may further include a control device that controls divided display regions. The control device can select region(s) for image display from the divided regions and can change the range and location for image display. The capability of changing the range and location for image display allows various applications achieved by combination of the function of displaying chromatic color(s) or the like and the function of displaying image(s) by the display panel.

Advantageous Effects of Invention

The present invention can provide a display device having an excellent designability and achieving display of chromatic color(s) and pattern(s) without power consumption in the no-image display state of the display panel, an electronic apparatus including the display device, a transflective reflector, and an electrical apparatus including the transflective reflector.

BRIEF DESCRIPTION OF DRAWINGS

FIG. 1 is a schematic cross-sectional view of a display device of Embodiment 1-1.

FIG. 2 includes schematic views of the display surface in the non-display state of the display device of Embodiment 1-1.

DESCRIPTION OF EMBODIMENTS

Figure 3:
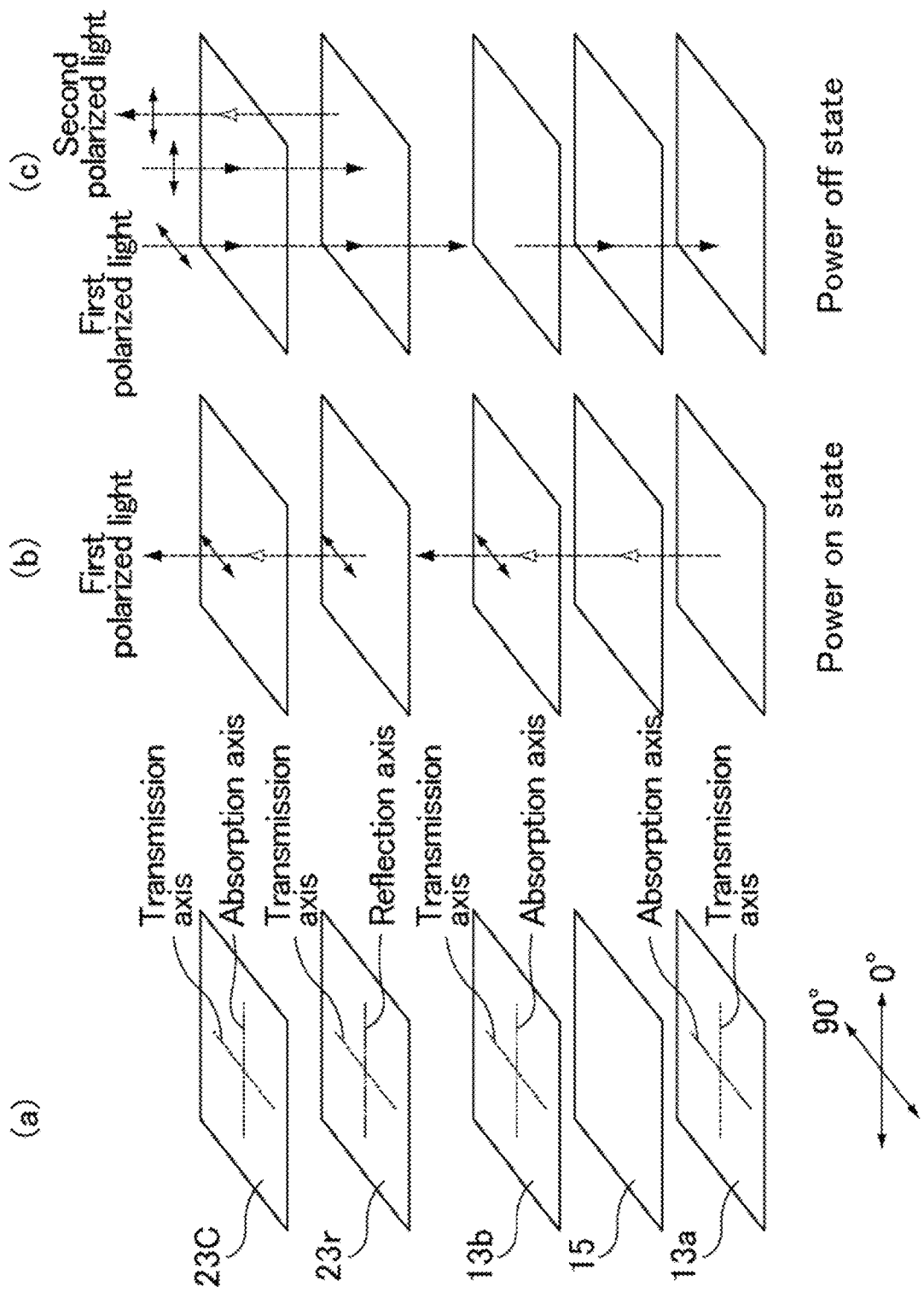
FIG. 3(a) is a drawing showing the configuration of the display device of Embodiment 1-1.
FIG. 3(b) is an explanatory view showing the operation principle of the image display state of the display device of Embodiment 1-1.
FIG. 3(c) is an explanatory view showing the operation principle of the no-image display state of the display device of Embodiment 1-1.

The present invention is described below in more detail based on embodiments with reference to the drawings. The embodiments, however, are not intended to limit the scope of the present invention. The configurations employed in the embodiments may appropriately be combined or modified within the spirit of the present invention.

Although, in the following embodiments, cases employing a liquid crystal display panel or an organic EL display panel as a display panel are described, the type of the display panel is not particularly limited and may be, for example, a plasma display panel, an inorganic EL display panel, or a micro electro mechanical system (MEMS) display. The lighting for the electrical apparatus may be any of various conventionally known products, such as a light emitting diode, as long as it functions as lighting and exerts the effects of the present invention.

The display state herein means, unless otherwise specified, a state in which display light is emitted from a display panel (when display is on) to pass through a transflective reflector, that is, the power on state of the display panel. The non-display state herein means, unless otherwise specified, a state in which no display light is emitted from a display panel (when display is off), that is, the power off state of the display panel. The display device of the present invention in the non-display state can display chromatic color(s) and pattern(s) without power consumption. The non-display state, in which, typically, no display light is emitted and only reflected external light is viewed, is also referred to as a reflective mode. Still, reflected external light exists also in the display state.

The reflectance herein means a reflectance in a wavelength band of visible light ranging from 400 to 700 nm, unless otherwise specified.

Embodiment 1-1

FIG. 1 is a schematic cross-sectional view of a display device of Embodiment 1-1. Embodiment 1-1 relates to a display device 1 that includes a liquid crystal display panel 10 and a transflective reflector 20 including a reflective polarizer 23r, a color polarizer 23C, and a front surface plate 29. In FIG. 1, the liquid crystal display panel 10 includes a backlight 11 and a liquid crystal cell 15 sandwiched between two absorptive polarizers 13a and 13b disposed in crossed Nicols. The transflective reflector 20 includes, for example, the front surface plate 29, the color polarizer 23C, and the reflective polarizer 23r and reflects certain polarized light but transmits polarized light vibrating in the direction perpendicular to the certain polarized light. The display device 1 of Embodiment 1-1 includes adhesive layers 27a and 27b, which are formed of an acrylic resin and are not light diffusing adhesive layers or no other light diffusing layers such as polarized light diffusion sheets. Thus, the display surface provides a specular surface with a metallic texture.

As shown in FIG. 1, the display device 1 includes, in the order from the back surface side to the viewing surface side, the liquid crystal display panel 10 and the transflective reflector 20. The liquid crystal display panel 10 and the transflective reflector 20 can be fixed by fitting the upper and lower edges of the transflective reflector 20 to a pair of aluminum rails which are attached to the upper and lower edges of the liquid crystal display panel 10 so as to form a frame-like structure. Here, an air layer may be or may not be formed in a slight gap between the liquid crystal display panel 10 and the transflective reflector 20. Alternatively, as described below, the reflective polarizer 23r of the transflective reflector 20 may be bonded to the liquid crystal display panel 10 via a transparent adhesive layer (e.g., acrylic resin). The important thing for solving the problem in the non-display state is the stacking order of the absorptive polarizers 13a and 13b and the reflective polarizer 23r (the reflective polarizer 23r should be placed on a side closer to the viewing surface than the absorptive polarizers 13a and 13b). Accordingly, disposing an isotropic transparent material such as an air layer, glass, or transparent resin, which does not particularly influence polarization states, between the absorptive polarizer 13b and the reflective polarizer 23r causes no problem. The "viewing surface" herein means, in FIG. 1, the upper surface (the surface on the side of viewer who observes the displayed contents), and thus the "viewing surface side" or "viewer side" means the upper side (the viewer side) in FIG. 1. The "back surface" means, in FIG. 1, the lower surface (the surface on the opposite side of the viewing surface), and thus the "back surface side" means the lower side (the opposite side to the viewing surface side) in FIG. 1. The same shall apply to each case.

The liquid crystal display panel 10 includes, in the order from the back surface side to the viewing surface side, the backlight 11, the absorptive polarizer 13a, the liquid crystal cell 15, and the absorptive polarizer 13b. The liquid crystal display panel 10 may be, for example, a commercially available liquid crystal television with ultra-violet induced multidomain vertical alignment ($UV^2A$) as a photoalignment technique. The liquid crystal display panel 10 may appropriately include a bezel or the like in the frame region. Preferred examples of the bezel include one made of a plastic resin whose color is the same as the color of the transflective reflector 20.

The absorptive polarizer 13a may be bonded to the back surface side of the liquid crystal cell 15 with a transparent adhesive layer (not shown) such as acrylic resin. The absorptive polarizer 13b may be bonded to the viewing surface side of the liquid crystal cell 15 with a transparent adhesive layer (not shown) such as acrylic resin. Preferably, the azimuth of the transmission axis of the absorptive polarizer 13a is 0° and the azimuth of the transmission axis of the absorptive polarizer 13b is 90° when the azimuths are defined to be positive (+) in the counterclockwise direction from the long side of the liquid crystal display panel 10 as a reference line. In other words, the transmission axes of the absorptive polarizer 13a and the absorptive polarizer 13b are preferably disposed in crossed Nicols. Hereinafter, the azimuths of axes are described according to the above definition. Also, the drawings show the azimuths of transmission axes based on this definition. The viewing surface side of the absorptive polarizer 13b may have undergone not antireflection treatment but anti-glare treatment, for example.

The absorptive polarizer 13b disposed on the viewing surface side of the liquid crystal display panel 10 may be excluded and the functions thereof may alternatively be conducted by the reflective polarizer 23r disposed in the transflective reflector 20. Yet, since the degree of polarization of a reflective polarizer is typically lower than that of an absorptive polarizer, exclusion of the absorptive polarizer 13b causes a decrease in the contrast ratio of the liquid crystal display panel 10 in the display state. Conversely, a sufficient degree of polarization of the reflective polarizer 23r allows exclusion of the absorptive polarizer 13b without reducing the contrast ratio in the display state. In order to exclude the absorptive polarizer 13b, the degree of polarization of the reflective polarizer 23r is preferably 90% or higher (contrast ratio of 10 or higher), more preferably 99% or higher (contrast ratio of 100 or higher).

The transflective reflector 20 includes, in the order from the back surface side to the viewing surface side, the reflective polarizer 23r as a transflective reflector layer, the adhesive layer 27a, the color polarizer 23C, the adhesive layer 27b, and the front surface plate 29 as a transparent substrate holding the color polarizer 23C. The adhesive layer 27a bonds the reflective polarizer 23r and the color polarizer 23C together. Similarly, adhesive layer 27b bonds the color polarizer 23C and the front surface plate 29 together. The adhesive layers 27a and 27b may each be, for example, an, adhesive made of an acrylic resin.

The front surface plate 29 is not particularly limited as long as it is made of a transparent material, and typical examples include glass, acrylic resin, and polycarbonate resin. The front surface plate 29 is made of preferably glass, more preferably toughened glass, from the viewpoint of achieving good flatness and good rigidity of the transflective reflector. The thickness of the front surface plate 29 is preferably 0.5 to 4 mm, for example, 2.5 mm, but may be thinner than 0.5 mm or thicker than 4 mm. From the viewpoint of allowing the transflective reflector 20 to function as a mirror, preferably, no antireflection film is disposed on the viewing surface side of the front surface plate 29. Alternatively, the front surface plate may be excluded. The same shall apply to the following embodiments.

The reflective polarizer 23r may be, for example, a multilayer reflective polarizer (trade name: DBEF) available from Sumitomo 3M Ltd. The reflective polarizer 23r is disposed such that the azimuth of the transmission axis is 90°. The reflective polarizer 23r may be a wire grid reflective polarizer. Examples of the wire grid reflective polarizer include those disclosed in Patent Literatures 12 and 13. The transmission axis of the absorptive polarizer 13a (azimuth: 0°) and the transmission axis of the reflective polarizer 23r (azimuth: 90°) are substantially perpendicular to each other. The transmission axis of the absorptive polarizer 13b (azimuth: 90°) and the transmission axis of the reflective polarizer 23r (azimuth: 90°) are substantially parallel to each other. The expression two directions are substantially perpendicular to each other herein means that the two directions form an angle within the range of 90±3°, preferably 90±1°, more preferably 90±0.5°. The expression two directions are substantially parallel to each other herein means that the two directions form an angle within the range of 0±3°, preferably 0±1°, more preferably 0±0.5°.

The color polarizer 23C imparts a chromatic color to part of transmitted light. Specifically, a color polarizer herein means an absorptive polarizer that has a transmission axis and an absorption axis perpendicular to the transmission axis and transmits polarized light vibrating in the transmission axis direction. In the case of polarized light vibrating in the absorption axis direction, the color polarizer transmits only a certain wavelength component in a wavelength band of visible light and absorbs the other wavelength components. In other words, in the presence of the color polarizer, polarized light vibrating in the transmission axis direction is transparent while polarized light vibrating in the absorption axis direction has a chromatic color. The color polarizer 23C may be formed by stretching a plastic film dyed with a dichromatic dye. The dyeing means a process in which a dye is dispersed in water, a film is immersed in the dispersion, and thereby the dye soaks into the film.

The "chromatic color" herein may be any chromatic color. In the display device of Embodiment 1-1, the transflective reflector includes a color polarizer. Accordingly, the display device can display chromatic color(s) and pattern(s) without power consumption in the non-display state of the display panel and reduce the color effect in the display state, which enables suitable use of any chromatic color. The same effects can be achieved in the display devices of the following embodiments.

The color polarizer 23C was bonded to the front surface plate 29 via the transparent adhesive layer 27b such that the transmission axis of the color polarizer 23C was parallel to the transmission axis of the absorptive polarizer 13b (perpendicular to the transmission axis of the absorptive polarizer 13a). Furthermore, the reflective polarizer 23r was bonded to the resulting workpiece via the transparent adhesive layer 27a such that the transmission axis of the reflective polarizer 23r was parallel to the transmission axis of the absorptive polarizer 13b (perpendicular to the transmission axis of the absorptive polarizer 13a).

As in the case of Embodiment 1-1, when the transflective reflector 20 is not provided with a light diffusing layer such as a light diffusing adhesive layer or a light diffusion sheet, the display surface provides a specular surface with a metallic texture. As in the case of Embodiment 1-2 described later, when the transflective reflector is provided with a light diffusing layer such as a light diffusing adhesive layer or a light diffusion sheet, the display surface provides a mat texture (calm texture) with little reflection. Accordingly, when a mat texture with little reflection is desired, for example, the adhesive layer 27a or the adhesive layer 27b may be replaced by a light diffusing adhesive layer or a light diffusion sheet may be additionally provided. The light diffusing layer such as the light diffusing adhesive layer and the light diffusion sheet is typically disposed on the upper side of the reflective polarizer.

FIG. 2 includes schematic views of the display surface in the non-display state of the display device of Embodiment 1-1. As shown in FIG. 2, the transflective reflector may have a surface with a single color or gradation between light and dark colors. The surface may have multiple colors, that is, pattern(s). The surface can reproduce, for example, the texture of a wall paper or a timber. The display of Embodiment 1-1 has many color variations as described and thus can achieve various designs. The same shall apply to the following embodiments.

The display device of Embodiment 1-1 can be operated in both of the image display state and the no-image display state by the following principles. These operation principles are described with reference to FIGS. 3(a) to 3(c). FIG. 3(a) is a drawing showing the configuration of the display device of Embodiment 1-1. FIG. 3(b) is an explanatory view showing the operation principle of the image display state of the display device of Embodiment 1-1. FIG. 3(c) is an explanatory view showing the operation principle of the no-image display state of the display device of Embodiment 1-1. In FIGS. 3(a) to 3(c), part of the display device shown in FIG. 1 is taken out and the members are shown separately, for convenience. The arrows in FIGS. 3(b) and 3(c) show light paths when light passes through a member. Hereinafter, linearly polarized light that vibrates in a 90° azimuth is also referred to as first polarized light, and linearly polarized light that vibrates in a 0° azimuth is also referred to as second polarized light. The same shall apply to each case.

In the display state, an image is displayed on the liquid crystal display panel in the power on state, and a viewer sees the image of the liquid crystal display panel through the transflective reflector. As shown in the light path in FIG. 3(b), light emitted from the liquid crystal display panel is first polarized light. Here, the transmission axes of the reflective polarizer 23r and the color polarizer 23C of the transflective reflector are set to a 90° azimuth. The first polarized light thus can pass through the reflective polarizer 23r and the color polarizer 23C with little loss. Therefore, the display device of Embodiment 1-1 can perform display with a high luminance despite including the transflective, reflector. Here, the first polarized light, which passes through the transmission axis of the color polarizer 23C, is of course not colored.

In the non-display state (reflective mode), no image is displayed on the liquid crystal display panel in the power off state, and the viewer sees only external light reflected by the transflective reflector. As shown in the light paths in FIG. 3(c), the color polarizer 23C transmits almost all the components of linearly polarized light that is incident on the transflective reflector from the viewer side, vibrates in the 0° direction, and has a certain wavelength (shown as second polarized light in FIG. 3(c)) (the color polarizer 23C transmits only light with a certain wavelength and absorbs light with the other wavelengths, whereby the transmitted light is colored). The light is then reflected by the reflective polarizer 23r, passes through the color polarizer 23C again, and is emitted to the viewer side. Thus, the display device of Embodiment 1-1 in the non-display state functions as a reflector with a certain color. The display device of Embodiment 1-1 can be operated in both of the display state and the non-display state by the above principles. Then, the display device of Embodiment 1-1 in the non-display state provides a colored (chromatic) reflection surface. Here, when the color of the case housing the apparatus is similar to the reflection color of the transflective reflector, the display device can achieve a design in which no display seems to exist in the non-display state.

Thus, in the display device of Embodiment 1-1 in the non-display state, the surface of the transflective reflector is recognized as a colored (chromatic) reflection surface, whereby excellent designability is achieved. As described above, for example, allowing the case of the electronic apparatus to have a similar color to the reflection color of the transflective reflector achieves a design in which no display seems to exist in the non-display state. Quantitatively, similar colors have a color difference ΔE of preferably 6.5 or less, more preferably 3.2 or less. A color difference ΔE means a distance between two points in a L*a*b* color space and is calculated by the following formula (1).

$$\Delta E = [(\Delta L^*)^2 + (\Delta a^*)^2 + (\Delta b^*)^2]^{1/2} \quad (1)$$

As shown in the light paths in FIG. 3(c), in the non-display state, the first polarized light incident on the transflective reflector from the viewer side passes through the color polarizer 23C and the reflective polarizer 23r. Then, the transmitted light passes through the absorptive polarizer 13b and the liquid crystal cell 15 in the stated order to be absorbed by the absorptive polarizer 13a in the end. This explanation will be omitted in the following cases.

The display device of Embodiment 1-1 includes the colored reflection surface in the non-display state, thereby achieving excellent designability. For example, the display device in the non-display state can assimilate to the chromatic case. Also, an application is possible in which the display device is built in a chromatic door or a wall of an appliance such as a refrigerator to be integrated with the door or the wall.

The mentioned Embodiment 1-1 employs a configuration in which the transmission axis of the absorptive polarizer 13b (azimuth: 90°) and the transmission axes of the reflective polarizer 23r and the color polarizer 23C (azimuth: 90°) are substantially parallel to each other (as a result, a configuration in which the transmission axis of the absorptive polarizer 13a (azimuth: 0°) and the transmission axes of the reflective polarizer 23r and the color polarizer 23C (azimuth: 90°) are substantially perpendicular to each other). As a modified example of Embodiment 1-1, a configuration may be employed in which the transmission axis of the absorptive polarizer on the viewing surface side of the liquid crystal display panel and the transmission axes of the reflective polarizer and the color polarizer of the transflective reflector are substantially not parallel to each other (as a result, a configuration in which the transmission axis of the absorptive polarizer on the back surface side of the liquid crystal display panel and the transmission axes of the reflective polarizer and the color polarizer of the transflective reflector are substantially not perpendicular to each other). Here, when the azimuth of the transmission axis of the reflective polarizer is 0°, light emitted from the liquid crystal display panel cannot pass to the viewing surface side as display light. From the viewpoint of transmitting light emitted from the liquid crystal display panel to the viewing surface side with as little loss as possible, the configuration of Embodiment 1-1 is preferred. The same shall apply to each case.

Although Embodiment 1-1 employs a configuration including the front surface plate 29, a configuration without the front surface plate 29 is allowable. An example thereof may be a configuration in which a light diffusing layer is bonded to the viewing surface side of the color polarizer 23C with an acrylic adhesive, thereby excluding the front surface plate 29. An alternative configuration may include the color polarizer 23C bonded to the back surface side of the front surface plate 29 and the light diffusing layer bonded to the viewing surface side of the front surface plate 29. The same shall apply to each case.

Still another configuration may be employed which includes a medium giving no influence on the polarization state of transmitted light (e.g., a hard coat layer, a protective film with a low birefringence) because such a medium gives no influence on the operation of the display device when disposed between the members of the display device. The same shall apply to each case.

Embodiment 1-2

Figure 4:
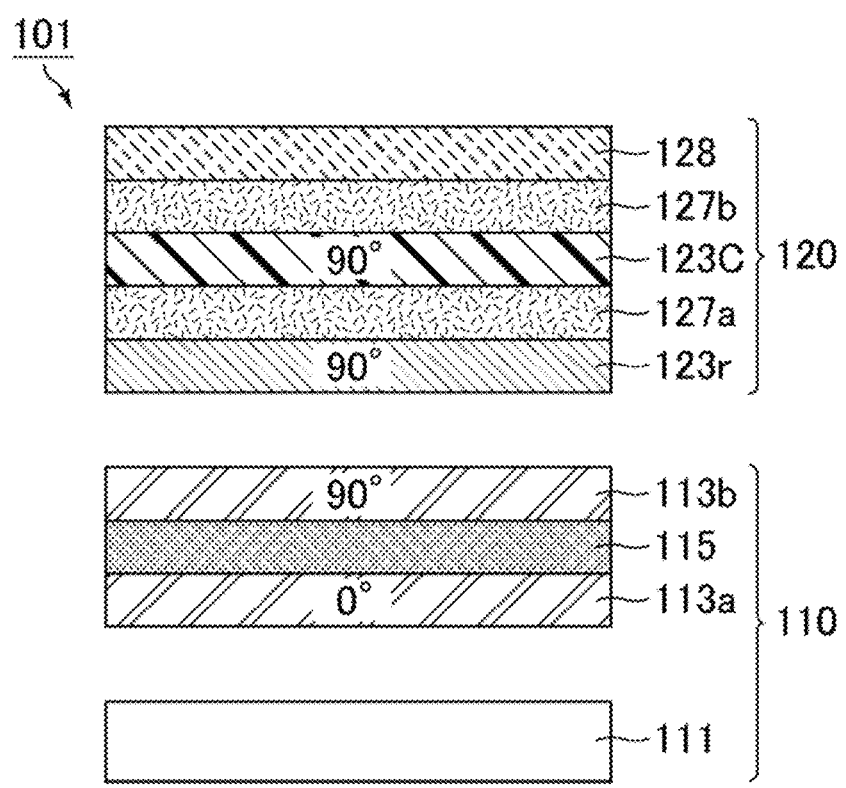
FIG. 4 is a schematic cross-sectional view of a display device of Embodiment 1-2.

The following describes a display device 101 of Embodiment 1-2 that achieves a more mat texture (calm texture) with less reflection than the display device of Embodiment 1-1 in the non-display state. FIG. 4 is a schematic cross-sectional view of an example of a display device of Embodiment 1-2. FIG. 4 shows a configuration in which a light diffusion sheet 128 as a light diffusing layer is bonded to the viewing surface side of the color polarizer 123C of the display device of Embodiment 1-1 via an acrylic adhesive, whereby the front surface plate is excluded. The rest configuration is the same as that of the display device of Embodiment 1-1. In other words, Embodiment 1-2 relates to a display device that includes a liquid crystal display panel 110 and a transflective reflector 120 including a reflective polarizer 123r, the color polarizer 123C, and the light diffusion sheet 128.

Provision of a light diffusing layer with quite a high light diffusion property, for example, a light diffusing layer with a haze value of higher than 70%, causes a reduction in contrast ratio for image display. Thus, the haze value is, for example, preferably 70% or lower, more preferably 60% or lower, still more preferably 50% or lower. The haze value is preferably 5% or higher, more preferably 10% or higher, and still more preferably 20% or higher. The haze value may be, for example, 30%.

Figure 5:
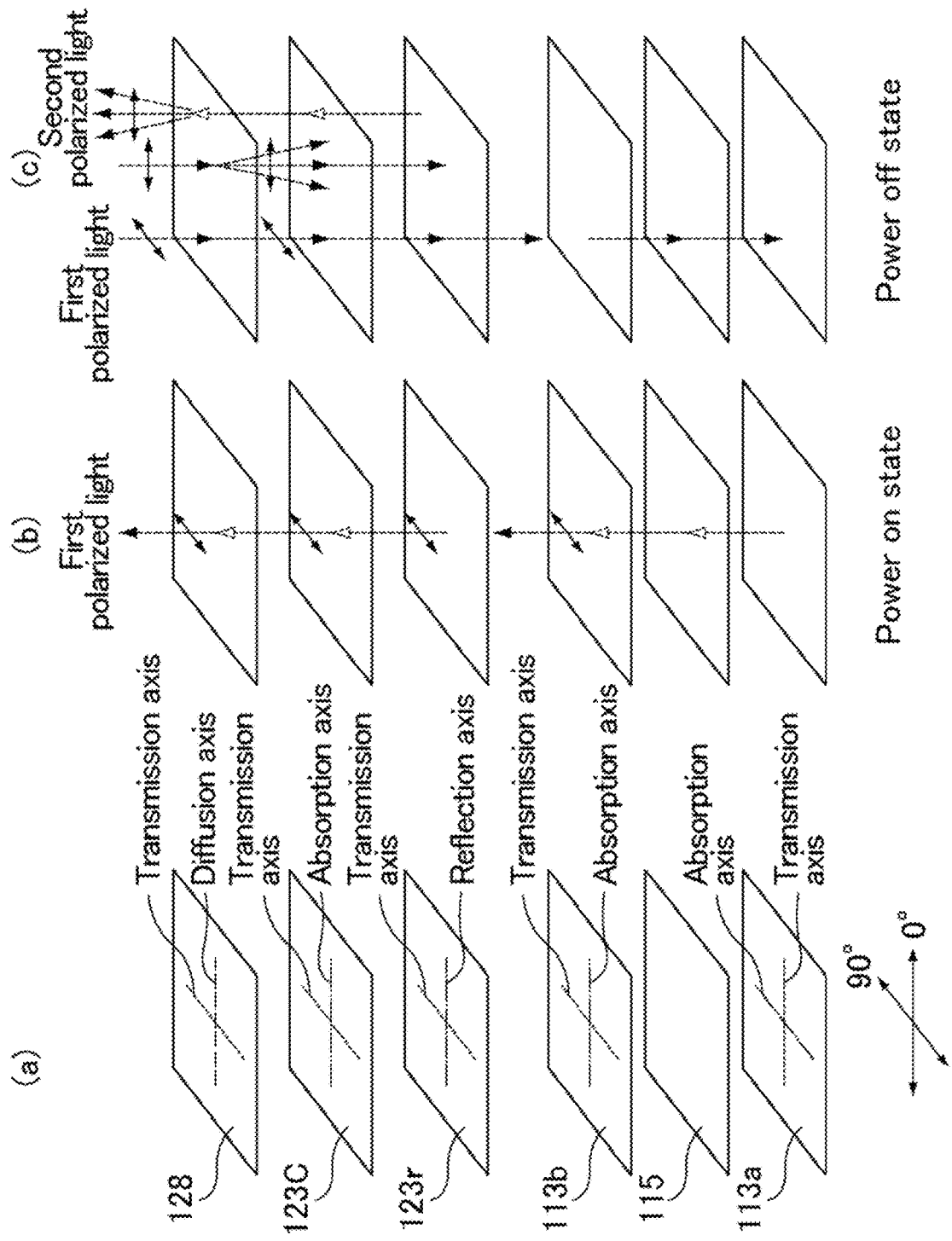
FIG. 5(a) is a drawing for illustrating the configuration of the display device of Embodiment 1-2.
FIG. 5(b) is an explanatory view showing the operation principle of the image display state of the display device of Embodiment 1-2.
FIG. 5(c) is an explanatory view showing the operation principle of the no-image display state of the display device of Embodiment 1-2.

FIG. 5(a) is a drawing for illustrating the configuration of the display device of Embodiment 1-2. FIG. 5(b) is an explanatory view showing the operation principle of the image display state of the display device of Embodiment 1-2. FIG. 5(c) is an explanatory view showing the operation principle of the no-image display state of the display device of Embodiment 1-2. The display device of Embodiment 1-2 achieves a display surface with a mat texture by the light diffusion sheet 128 functioning as a light diffusing layer. As mentioned above, when the display surface is desired to have a mat texture, the transflective reflector is provided with preferably a light diffusing layer such as a light diffusing adhesive layer or a light diffusion sheet, more preferably a polarized light diffusing layer. Preferably, the polarized light diffusing layer is anisotropic in diffusing polarized light, and its diffusion axis is parallel to the reflection axis of the reflective polarizer. The polarized light diffusing layer diffuses linearly polarized light vibrating at the azimuth of the diffusion axis. In other words, a polarized light diffusing layer herein means a light diffusing layer that includes a transmission axis and a diffusion axis perpendicular to the transmission axis, transmits polarized light vibrating in the transmission axis direction, and diffuses polarized light vibrating in the diffusion axis direction. When a polarized light diffusing layer is used, its haze value is not limited to the above numerical range because the haze value ideally does not influence image display. However, in some cases, the haze at the azimuth of the transmission axis influences image display. Thus, having a haze value within the numerical range is a preferred embodiment of the present invention.

The polarized light diffusion sheet may be one adjusted to have prescribed optical properties referring to, for example, JP 2010-026454 A. The sheet may be disposed with the azimuth of the transmission axis at 90°. Here, the transmission axis of the polarized light diffusion sheet means, as described above, the stretch axis when the polarized light diffusion sheet is produced by the method disclosed in the above publication. The polarized light diffusion sheet efficiently transmits linearly polarized light vibrating at the azimuth of the transmission axis and diffuses polarized light vibrating at the azimuth perpendicular to the azimuth (this azimuth is defined as the azimuth of the diffusion axis). When a haze is measured with polarized light vibrating at the azimuth of the transmission axis as a measurement light source, the haze is lower than the case with light vibrating at the azimuth of the diffusion axis as a measurement light source. For example, polarized light diffusion sheets with properties as shown in Table 1 are obtainable. The sheets of samples 1 to 3 have different physical hazes as shown in Table 1 because fine particles dispersed in the polarized light diffusion sheets have different sizes and refractive indices. Any of the obtainable samples may be suitably applied to the display device of the present invention. Unfortunately, the sheets have some haze also at the azimuth of the transmission axis. Thus, the sheet of the sample 3, for example, causes some influence on image display. The sheet of the sample 1, which caused almost no influence on image display, was most excellent.

TABLE 1

| | Haze [%] | | |
|---|---|---|---|
| | Azimuth of diffusion axis | Azimuth of transmission axis | Average |
| Sample 1 | 48.7 | 13.2 | 31.0 |
| Sample 2 | 70.0 | 20.6 | 45.3 |
| Sample 3 | 75.6 | 28.2 | 51.9 |

In the liquid crystal display panel in the power on state, light emitted from the liquid crystal display panel is linearly polarized light vibrating in the 90° direction (in FIG. 5(b), shown as first polarized light) and passes through the reflective polarizer 123r and the color polarizer 123C whose transmission axes are set to 90° with little loss. Transmitted light then passes through the polarized light diffusion sheet 128 without being diffused by the polarized light diffusion sheet 128 whose transmission axis is aligned with the transmission axes of the reflective polarizer 123r and the color polarizer 123C, which eliminates the possibility of a reduction in luminance and occurrence of blurred image. The display device of Embodiment 1-2 in the display state achieves display with a high luminance despite including the transflective reflector.

Meanwhile, in the liquid crystal display panel in the power off state, linearly polarized light incident on the transflective reflector from the viewer side and vibrating in the 0° direction (in FIG. 5(c), shown as second polarized light) is strongly diffused by the polarized light diffusion sheet 128 whose transmission axis is set to 90°, i.e., whose diffusion axis is set to 0°. The light is then incident on the reflective polarizer 123r as diffusion light, is mostly reflected by the reflective polarizer 123r, is diffused by the polarized light diffusion sheet 128 again, and is emitted to the viewer side. Thus, the display device of Embodiment 1-2 in the non-display state provides a colored display surface. The display surface of the display device of Embodiment 1-2 in the power off state provides a diffuse reflection surface and thus tends to match interiors and a case housing the display device having diffuse reflection surfaces.

Figure 6:
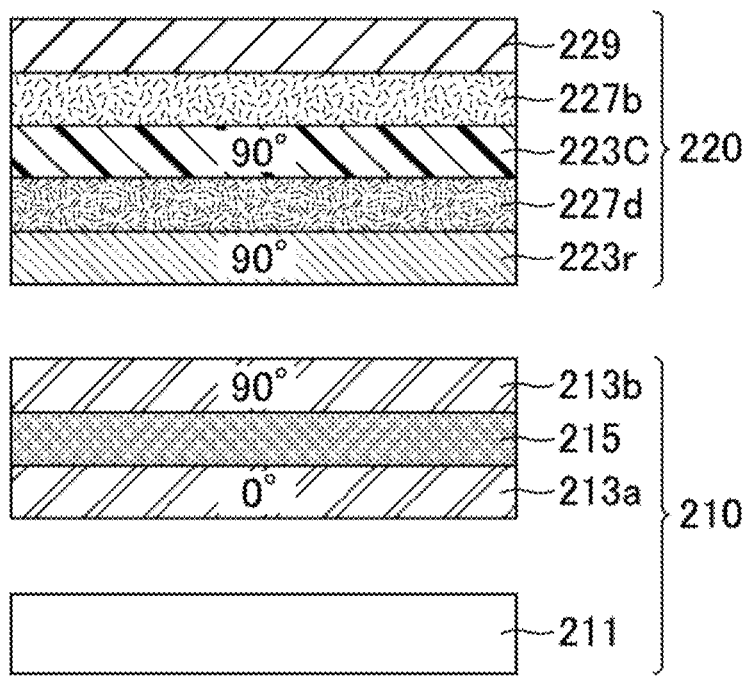
FIG. 6 is a schematic cross-sectional view of a display device of a modified example of Embodiment 1-2.

FIG. 6 is a schematic cross-sectional view of a display device of a modified example of Embodiment 1-2. The configuration of the display device of the modified example of Embodiment 1-2 is the same as that of the display device of Embodiment 1-1 except that the adhesive layer 27a shown in FIG. 1 is replaced by a light diffusing adhesive layer 227d. The light diffusing adhesive layer 227d may be one with fine particles of a light diffusing component dispersed in the layer. Examples of the light diffusing component include titanium oxide fine particles. The light diffusing adhesive layer 227d achieves a display surface with a mat texture in the display device of the modified example of Embodiment 1-2. Except for this point, the display device of the modified example of Embodiment 1-2 works based on the same operation principles as the display device of Embodiment 1-1, thereby achieving the same effects.

As described above, from the viewpoint of achieving a display surface with a mat texture, preferred is providing a light diffusion sheet (e.g., polarized light diffusion sheet) instead of the front surface plate as in the display device of Embodiment 1-2 or using a light diffusing adhesive layer as an adhesive layer as in the display device of the modified example of Embodiment 1-2. Alternatively, providing a light diffusing layer such as a light diffusion sheet on the viewing surface side of the front surface plate or using a reflective polarizer with a light diffusing function as a reflective polarizer is allowable. Thus, providing a light diffusing layer such as a light diffusing adhesive layer, a light diffusion sheet, or a reflective polarizer with a light diffusing function on the transflective reflector can prevent reflection of lighting and objects placed in front (on the viewing surface side) of the display device. As described, these light diffusing layers are preferably polarized light diffusing layers.

In the display devices shown in FIG. 1 and FIG. 3 to FIG. 6, the adhesive layer may be replaced by an air layer as long as gaps between the members are physically held. The same shall apply to each case.

Figure 7:
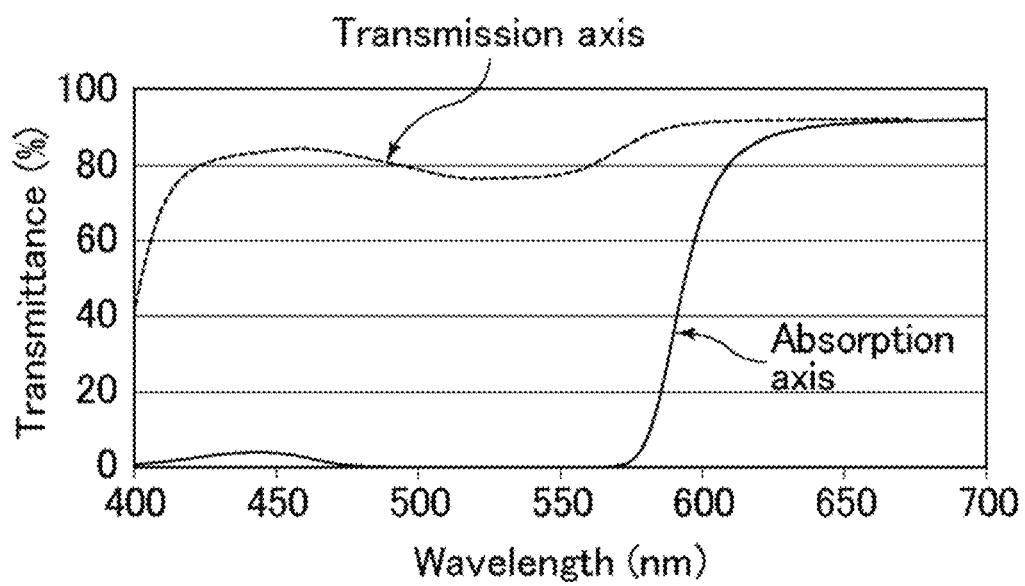
FIG. 7 is a graph showing the reflectance (%) versus a wavelength (nm) of a color polarizer.

FIG. 7 is a graph showing the reflectance (%) versus a wavelength (nm) of a color polarizer. The color polarizer was produced with a red dichroic dye. As a result, a reflection property as shown in the graph of FIG. 7 was obtained. In the presence of the color polarizer, polarized light incident in the direction parallel to the transmission axis was almost transparent. Also, the color polarizer mostly absorbed polarized light that was incident in the direction parallel to the absorptive axis and had a wavelength in 400 to 570 nm to transmit red light only. In a display device including a transflective reflector with such a color polarizer, the display surface appears red in the non-display state. The transflective reflector of the modified example of Embodiment 1-2, which includes a light diffusing adhesive layer, can provide a display surface with a mat red texture. The appearance of the case had a color and texture close to those of the display surface by coating a resin material in red or red anodizing surface-blasted aluminum. If no light diffusing adhesive layer is provided and an adhesive layer without a light diffusing function is provided instead, the display surface has a metallic texture with specularity as in the display device of Embodiment 1-1. In this case, the wrapping of the case can have a color and a texture close to those of the display surface by red anodizing aluminum.

(Electronic Apparatus)

Figure 8:
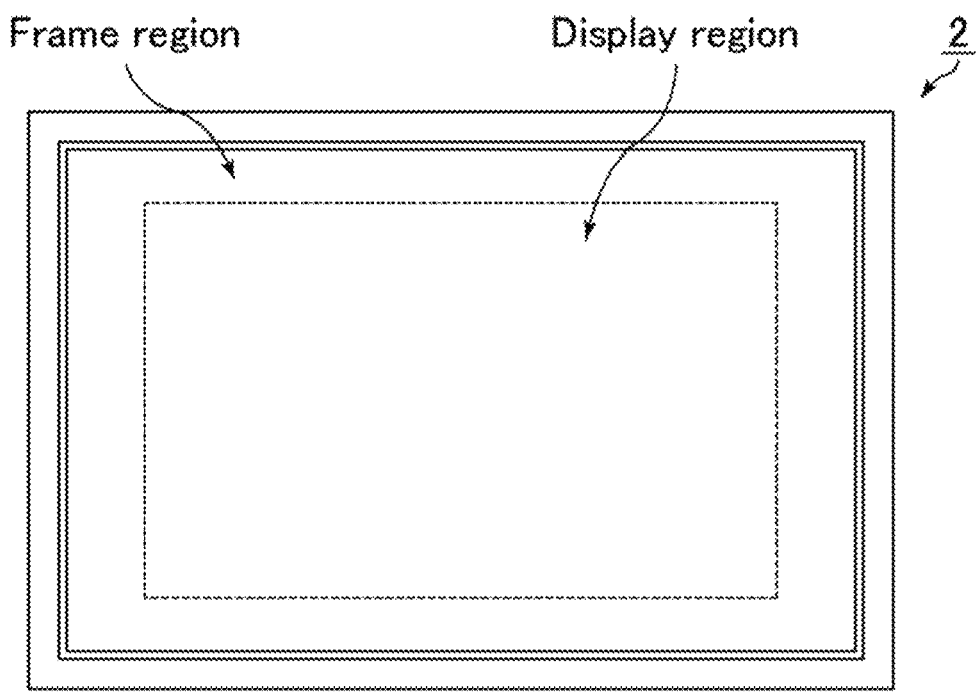
FIG. 8 is a schematic plan view of an electronic apparatus including the display device of the modified example of Embodiment 1-2 housed in a case.
Figure 9:
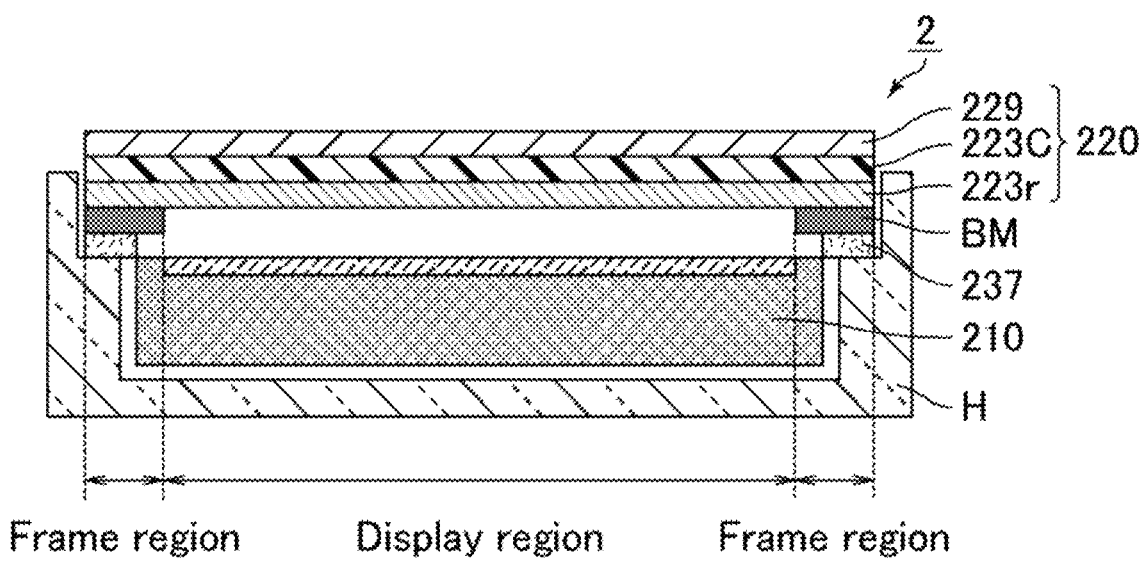
FIG. 9 is a schematic cross-sectional view of the electronic apparatus shown in FIG. 8.

The following describes the case where the display device of the modified example of Embodiment 1-2 is housed in a case to be produced into an electronic apparatus. FIG. 8 is a schematic plan view of an electronic apparatus including the display device of the modified example of Embodiment 1-2 housed in a case. FIG. 9 is a schematic cross-sectional view of the electronic apparatus shown in FIG. 8. The configurations of a liquid crystal display panel 210 and a transflective reflector 220 are as described in the above modified example of Embodiment 1-2. Preferably, the transflective reflector 220 is formed in one size larger than that of the liquid crystal display panel 210. In FIG. 9, an adhesive layer and a light diffusing adhesive layer that bond the members in the transflective reflector 220 are not illustrated. The transflective reflector 220 is divided into a display region and a frame region. The display region is a region superimposed on the display region (also referred to as an active area) of the display device in a plan view of the display surface. The frame region is a peripheral region of the display region of the display device. In the frame region on the back surface side of the transflective reflector 220, a light-shielding layer BM is formed. The light-shielding layer BM functions to hide the frame of the liquid crystal display panel 210 and to block stray light or the like emitted from the liquid crystal display panel 210. The light-shielding layer BM may be formed by a widely used method, such as forming the light-shielding layer BM with a black ink by screen printing. To the light-shielding layer BM, an adhesive layer 237 is attached in order to fix the light-shielding layer BM in the case H. The case H is designed to have a similar color and a similar diffusing property to those of the transflective reflector 220. In such an electronic apparatus 2 with the liquid crystal display panel 210 in the non-display state, the transflective reflector 220 and the case H seem to be integrated, which gives an impression as if the screen has disappeared.

The above description is an example of the configuration of the electronic apparatus and the present invention is not limited to this example. The following describes a problem when the display device is housed in a case and a method for solving the problem. The problem and the method for solving the problem shall apply to each embodiment described below.

<Problem when Display Device is Housed in Case>

Figure 10:
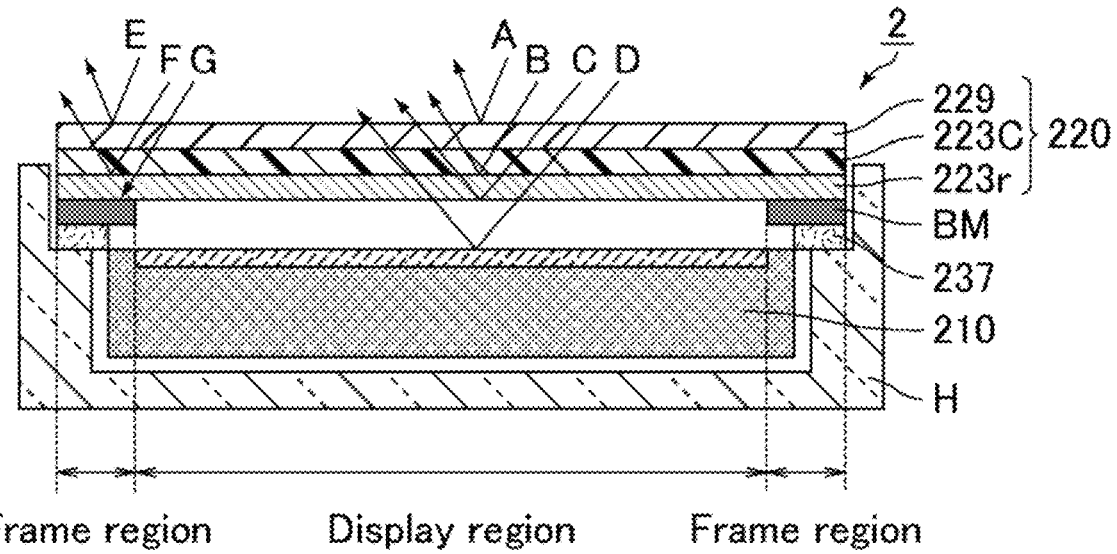
FIG. 10 is a schematic view showing light paths of light incident from the periphery on the electronic apparatus including the display device of the modified example of Embodiment 1-2 housed in a case.

FIG. 10 is a schematic view showing light paths of light incident from the periphery on the electronic apparatus including the display device of the modified example of Embodiment 1-2 housed in a case. Here, a problem when the light-shielding layer BM is disposed underneath the transflective reflector 220 is described. In the display region, an air layer is provided on the back surface side of the reflective polarizer 223r in the transflective reflector 220. Accordingly, light paths of light incident from the periphery belong to the following four patterns.

Light A: reflected on the upper surface of the front surface plate 229

Light B: reflected on the upper surface of the reflective polarizer 223r

Light C: reflected on the lower surface of the reflective polarizer 223r Light D: reflected on the upper surface of the liquid crystal display panel 210

The light A has a reflectance of about 4% and has a small difference in reflectance between different wavelengths. Thus, the reflected light is white.

The light B, which passes through the color polarizer 223C twice, allows the reflected light to have a slightly strong color. The reflectance is 50% or less.

The light C and light D, each of which has a reflectance of about 4% and passes through the color polarizer 223C twice, allow the reflected light to have a slightly strong color.

In the frame region, the light-shielding layer BM is provided on the back surface side of the reflective polarizer 223r. Light paths of light incident from the periphery belong to the following three patterns.

Light E: reflected on the upper surface of the front surface plate 229 and corresponds to the light A Light F: reflected by the upper surface of the reflective polarizer 223r and corresponds to the light B Light G: absorbed by the light-shielding layer BM and not reflected In summary, presence or absence of the light C and light D causes differences in reflectance and tinge between the display region and the frame region. This problematically causes the boundary between the display region and the frame region to be visible.

<Method for Solving Problem when Display Device is Housed in Case>

Three methods for solving the problem are proposed in the following.

Figure 11:
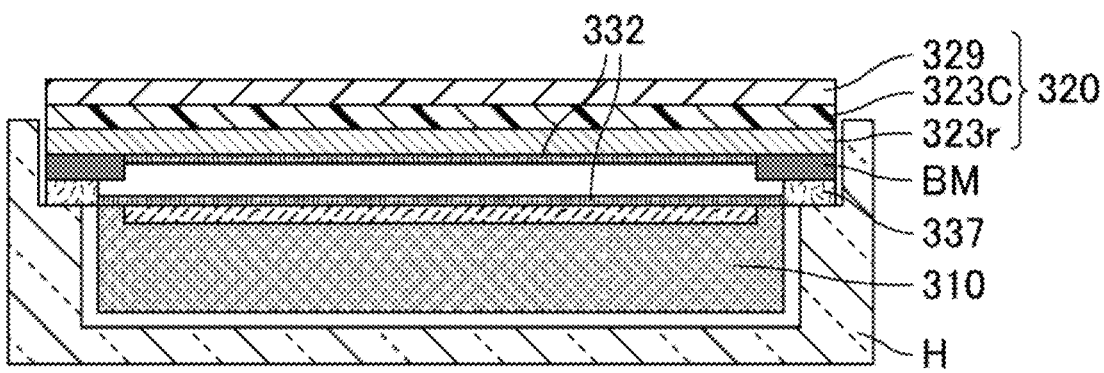
FIG. 11 is a schematic cross-sectional view showing an embodiment of an electronic apparatus including the display device of the modified example of Embodiment 1-2 housed in a case.

FIG. 11 is a schematic cross-sectional view showing an embodiment of an electronic apparatus including the display device of the modified example of Embodiment 1-2 housed in a case. In a first method, as shown in FIG. 11, an antireflection layer 332 is provided on (bonded to) the lower surface of a transflective reflector 320 and on the upper surface of a liquid crystal display panel 310. The antireflection layer 332 is obtained by forming a material with a low refractive index into a thin film or forming a moth-eye pattern with fine irregularities on a plastic film. Thereby, the reflectances of the light C and the light D come close to zero, whereby the boundary between the display region and the frame region is invisible.

Figure 12:
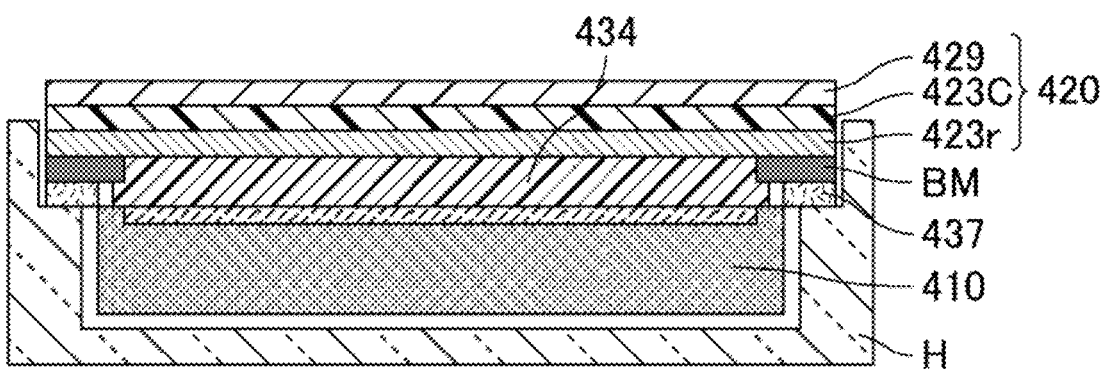
FIG. 12 is a schematic cross-sectional view showing an embodiment of an electronic apparatus including the display device of the modified example of Embodiment 1-2 housed in a case.

FIG. 12 is a schematic cross-sectional view showing an embodiment of an electronic apparatus including the display device of the modified example of Embodiment 1-2 housed in a case. In a second method, as shown in FIG. 12, an air layer between a transflective reflector 420 and a liquid crystal display panel 410 is filled with a material such as a transparent resin 434 whose refractive index is close to that of a polarizer. Typically, a polarizer and a transparent resin have a refractive index of about 1.5. Thereby, the reflectances of the light C and the light D come close to zero, whereby the boundary between the display region and the frame region is invisible.

Figure 13:
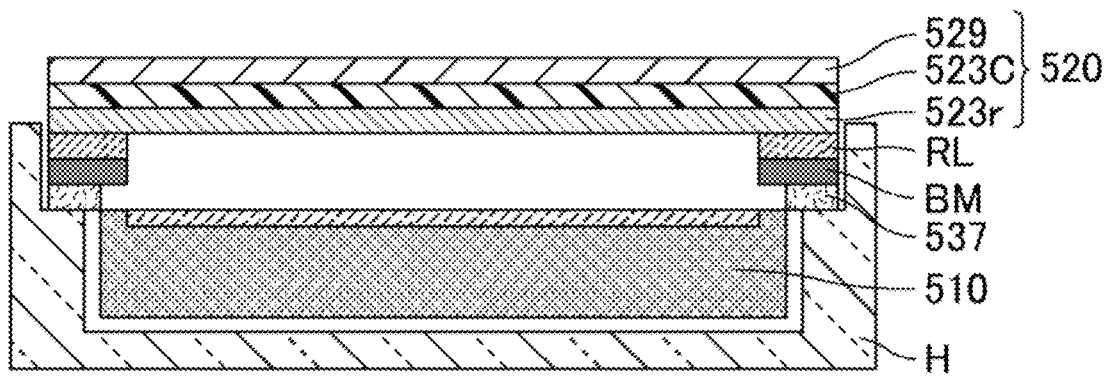
FIG. 13 is a schematic cross-sectional view showing an embodiment of the electronic apparatus including the display device of the modified example of Embodiment 1-2 housed in a case.

FIG. 13 is a schematic cross-sectional view showing an embodiment of an electronic apparatus including the display device of the modified example of Embodiment 1-2 housed in a case. In a third method, in the frame region, between a reflective polarizer 523r and the light-shielding layer BM, a reflective layer RL is provided whose reflection characteristics are similar to those of the light C and light D. The suitable reflectance of the reflective layer RL varies depending on the tinge of the reflective polarizer 523r and is, for example, about 1% to 10%. Thereby, the boundary between the display region and the frame region is invisible. In the third method, when the light-shielding layer BM is formed by a method such as screen printing, the reflective layer RL can be formed by using the same plate with a different ink, which hardly increases the cost. If stray light from a liquid crystal display panel 510 hardly causes an adverse effect, a configuration excluding the light-shielding layer BM and including only the reflective layer RL may be employed.

In an electronic apparatus obtained by using one of the problem solving methods, the screen turns red in the power off state of the display panel. Coating the case in a similar red color achieves an effect in which the screen seems to have disappeared. As shown in each embodiment, when the display panel displays chromatic color(s) and pattern(s) in the power off state using a color polarizer producing transparent light in the transmission axis direction, the color of light emitted from the display device in the power on state undergoes almost no change. Thus, there is no need for adjusting the color of the backlight and the tinge of the liquid crystal in order to correct color change (in order to adjust the tinge so that appropriate white balance is achieved when white display is provided). This is the greatest feature of the display device, the electronic apparatus, and the electrical apparatus of each embodiment.

The modified example of Embodiment 1-2 proposes an example of producing red light through the color polarizer in the absorption axis direction. Of course, the color polarizer may produce light in any chromatic color in the absorption axis direction. As mentioned above, even in the liquid crystal panel in the power on state, the color polarizer produces transparent light in the transmission axis direction, whereby light emitted from the display panel undergoes almost no color change. Accordingly, the color deepness of the color polarizer in the absorption axis direction is not limited. Here, in a wavelength band of visible light from 400 to 700 nm, if the proportion in transmittance of the minimum value to the maximum value is less than 5%, the coloring of the display surface in the no-display state is hardly recognized. Thus, such a proportion is not effective.

The modified example of Embodiment 1-2 has the following problem. That is, the display panel, even in the power on state, unfortunately colors and reflects surrounding light, thereby possibly causing a reduction in contrast ratio of the display screen and a change of tinge. Accordingly, the electronic apparatus of the present embodiment is suitable to an apparatus used in a not too bright place such as in a room. The electronic apparatus of the present embodiment is particularly effectively applied to an interior apparatus such as a television or a desktop personal computer (PC), and is also effectively used for consumer electronics such as refrigerators, washing machines, and microwave ovens.

Embodiment 2-1

Figure 14:
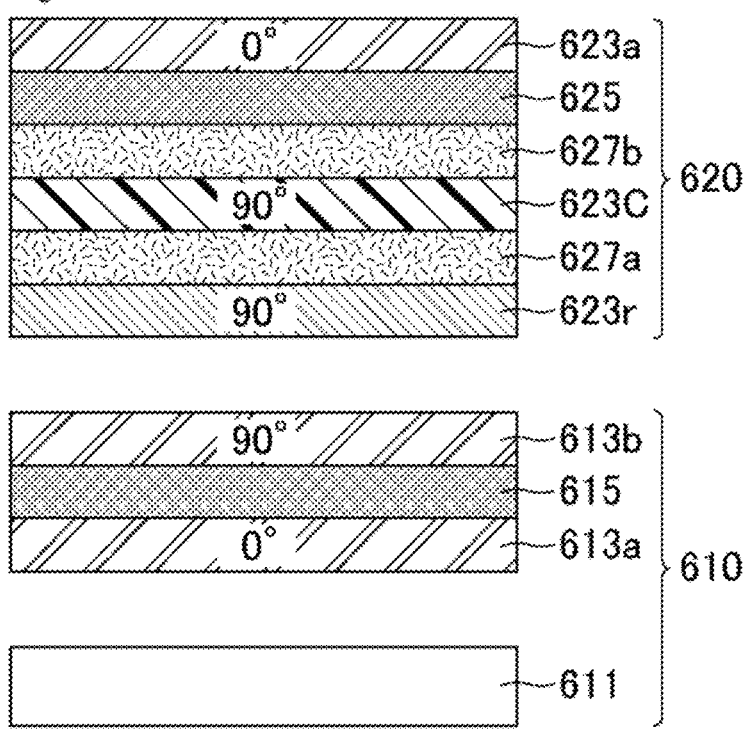
FIG. 14 is a schematic cross-sectional view of a display device of Embodiment 2-1.

FIG. 14 is a schematic cross-sectional view of a display device of Embodiment 2-1. In the display device of Embodiment 2-1, the front surface plate in Embodiment 1-1 is replaced by a liquid crystal panel 625 for switching and an absorptive polarizer 623a is further stacked. The configuration excepting the above points of the display device of Embodiment 2-1 is the same as that of the display device of Embodiment 1-1. In other words, Embodiment 2-1 relates to a display device that includes a liquid crystal display panel 610 and a transflective reflector 620 including a reflective polarizer 623r, a color polarizer 623C, the liquid crystal panel 625 for switching, and the absorptive polarizer 623a. Since the transflective reflector 620 includes no light diffusing layer, the display surface provides a specular surface with a metallic texture.

The liquid crystal panel 625 for switching is not particularly limited as long as it is switchable between the voltage applied state and the no-voltage applied state and can change the vibration direction of linearly polarized light having passed through the reflective polarizer 623r in one of the states (for example, the voltage applied state). In Embodiment 2-1, the liquid crystal panel 625 for switching may be, for example, a $UV^2A$ mode liquid crystal display panel for monochrome display with a phase difference of 320 nm. In a liquid crystal display panel for monochrome display, a color filter layer is excluded from a typical liquid crystal display panel for color display. The liquid crystal panel for switching may be a liquid crystal display mode liquid crystal panel such as a twisted nematic (TN) mode or in-plane switching (IPS) mode liquid crystal display.

As shown in FIG. 14, since the configuration of the display device of Embodiment 2-1 includes three absorptive polarizers 613a, 613b, and 623a in total and also includes a color polarizer 623C, a reduction in transmittance and yellow color shift of transmitted color are anticipated. In order to minimize such performance deterioration, preferably, at least one of the absorptive polarizers 613a, 613b, and 623a and the color polarizer 623C is adjusted to have a high transmittance or to be formed with a smaller amount of an ultraviolet ray (UV) absorber. Although adjusting the transmittance at a high value may cause a reduction in polarization degree, the performance of the display device is not adversely affected as long as the total system including the absorptive polarizers 613a, 613b, and 623a, the color polarizer 623C, and the reflective polarizer 623r keeps a required polarization degree. The same shall apply to UV resistance performance.

Figure 15:
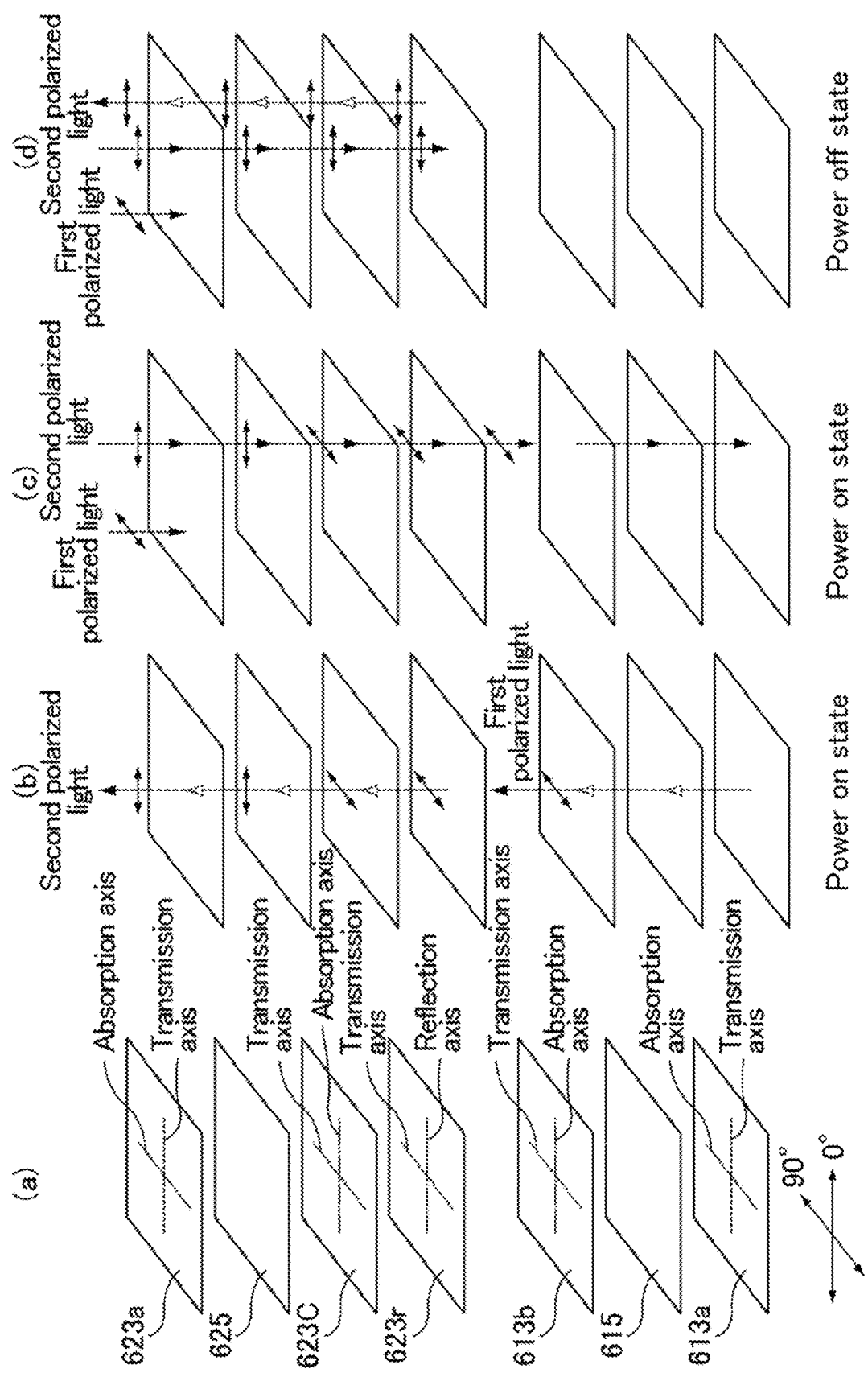
FIG. 15(a) is a drawing showing the configuration of the display device of Embodiment 2-1.
FIG. 15(b) is an explanatory view showing the operation principle of the image display state of the display device of Embodiment 2-1 from a viewpoint of display light.
FIG. 15(c) is an explanatory view showing the operation principle of the no-image display state of the display device of Embodiment 2-1 from a viewpoint of external light.
FIG. 15(d) is an explanatory view showing the operation principle of the non-display state of the display device of Embodiment 2-1.

FIG. 15(a) is a drawing showing the configuration of a display device of Embodiment 2-1. FIG. 15(b) is an explanatory view showing the operation principle of the image display state of the display device of Embodiment 2-1 from a viewpoint of display light. FIG. 15(c) is an explanatory view showing the operation principle of the no-image display state of the display device of Embodiment 2-1 from a viewpoint of external light. FIG. 15(d) is an explanatory view showing the operation principle of the no-image display state of the display device of Embodiment 2-1. In the image display state, light emitted from the liquid crystal display panel is linearly polarized light vibrating in the 90° direction (in FIG. 15(b), shown as first polarized light) and passes through the reflective polarizer 623r and the color polarizer 623C whose transmission axes are set to 90° with little loss. Then, the linearly polarized light passes through the liquid crystal panel 625 for switching in the on state (a state that can rotate the azimuth of linearly polarized light by 90° in the liquid crystal panel for switching, also referred to as a λ/2 condition), so that the azimuth of the linearly polarized light is rotated by 90° and the light finally passes through the absorptive polarizer 623a as second polarized light. The display device of Embodiment 2-1 achieves display with a high luminance despite including the transflective reflector.

Simultaneously in the image display state, linearly polarized light vibrating in the 90° direction (shown as first polarized light in FIG. 15(c)) incident on the transflective reflector from the viewer side is absorbed by the absorptive polarizer 623a whose transmission axis is set to 0°, i.e., whose absorption axis is set to 90°. Meanwhile, linearly polarized light vibrating in the 0° direction (shown as second polarized light in FIG. 15(c)) passes through the absorptive polarizer 623a whose transmission axis is set to 0°, and the azimuth of the light is rotated by 90° by the liquid crystal panel 625 for switching in the on state, and the light passes through the color polarizer 623C and the reflective polarizer 623r whose transmission axes are set to 90°. Then, the transmitted light passes through the absorptive polarizer 613b and a liquid crystal cell 615 in the stated order and is absorbed by the absorptive polarizer 613a in the end. Thus, the display device of Embodiment 2-1 causes no diffuse reflection of external light to achieve good visibility of the display panel in the display state.

Next, the no-image display state is discussed. Here, the liquid crystal panel 625 for switching is also brought to the off state (the state not altering the polarization state; also referred to as a zero condition) in advance. Linearly polarized light vibrating in the 0° direction (shown as second polarized light in FIG. 15(d)) incident on the transflective reflector from the viewer side passes through the liquid crystal panel 625 for switching in the off state while holding the polarization state. Then, almost all the amounts of the light is reflected by the reflective polarizer 623r and passes through the liquid crystal panel 625 for switching in the off state and the absorptive polarizer 623a whose transmission axis is set to 0° to be emitted to the viewer side.

In Embodiment 2-1, a half of light incident on the display device from outside is absorbed by the absorptive polarizer 623a and the rest half of light passes through the absorptive polarizer 623a. In the display panel in the power off state, light having passed through the absorptive polarizer 623a is reflected by the reflective polarizer 623r. In the display panel in the display state, light having passed through the absorptive polarizer 623a passes through the reflective polarizer 623r and is absorbed inside the display panel. Accordingly, the display device of Embodiment 2-1 with the display panel in the power on state achieves no diffuse reflection of external light, sufficient prevention of reflection, and display of an image with good visibility. Additionally, the contrast ratio is much better.

According to Embodiment 2-1 as above, in addition to the effects achieved by Embodiment 1-1, light reflection around the display device in the display state can be reduced, which achieves an effect of improving the contrast ratio of display. The display device of Embodiment 2-1 is particularly effective when applied to apparatuses used in bright places, and especially effective when applied to mobile devices such as smartphones, tablet PCs, and desktop PCs. This configuration using the same switching liquid crystal panel may be applied to other embodiments.

Embodiment 2-2

Embodiment 2-2 relates to a liquid crystal display device that includes a liquid crystal display panel and a transflective reflector including a reflective polarizer, a light diffusing adhesive layer, a color polarizer, a liquid crystal panel for switching, and an absorptive polarizer. The liquid crystal display device of Embodiment 2-2 has the same configuration as that of the display device of Embodiment 2-1 except that the adhesive layer 627a of the display device of Embodiment 2-1 shown in FIG. 14 is replaced by a light diffusing adhesive layer. The liquid crystal display device of Embodiment 2-2 provides a display surface with a mat texture because the transflective reflector includes a light diffusing layer. The light diffusing layer is preferably a polarized light diffusing layer.

Embodiment 3-1

Figure 16:
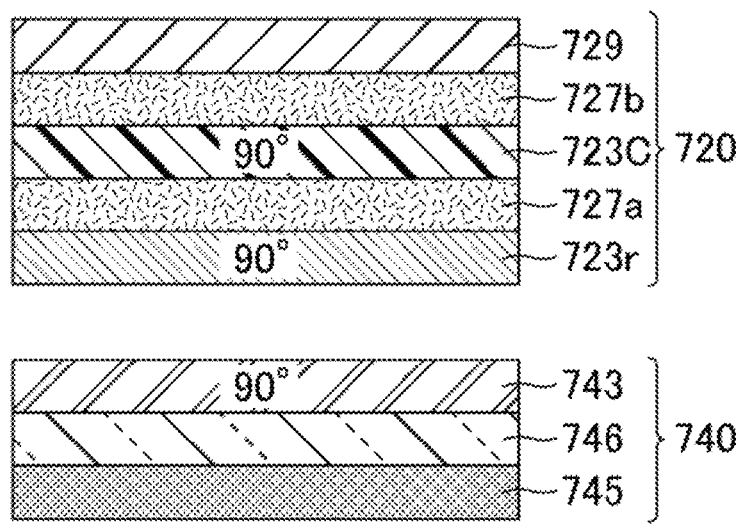
FIG. 16 is a schematic cross-sectional view of a display device of Embodiment 3-1.

FIG. 16 is a schematic cross-sectional view of a display device of Embodiment 3-1. The display device of Embodiment 3-1 has the same configuration as that of Embodiment 1-1 except that the liquid crystal display panel of the display device of Embodiment 1-1 is replaced by an organic EL display panel. Embodiment 3-1 relates to an organic EL display device that includes an organic EL display panel 740 and a transflective reflector 720 including a reflective polarizer 723r, a color polarizer 723C, and a front surface plate 729. In the organic EL display panel 740, an absorptive polarizer 743 and a retarder 746 were disposed on the upper surface of an organic EL cell 745. Preferred examples of the retarder 746 include a λ/4 plate and a product including a stack of a λ/2 plate and a λ/4 plate. Such a retarder 746 functions as a circular polarizer. In an organic EL display panel, a circular polarizer is typically disposed in order to reduce external light reflection and thereby to improve the contrast ratio of display. The display device of Embodiment 3-1 has the same principles, effects, and the like as the display device of Embodiment 1-1. Since the transflective reflector includes no light diffusing layer, the display surface provides a specular surface with a metallic texture.

Embodiment 3-2

Embodiment 3-2 relates to an organic EL display device that includes an organic EL display panel and a transflective reflector including a reflective polarizer, a light diffusing adhesive layer, a color polarizer, and a front surface plate. The organic EL display device of Embodiment 3-2 has the same configuration as that of the organic EL display device of Embodiment 3-1 except that the adhesive layer 727a of the organic EL display device of Embodiment 3-1 shown in FIG. 16 is replaced by a light diffusing adhesive layer as a light diffusing layer. The organic EL display device of Embodiment 3-2 provides a display surface with a mat texture because the transflective reflector includes a light diffusing layer. The light diffusing layer is preferably a polarized light diffusing layer.

Embodiment 4-1

Figure 17:
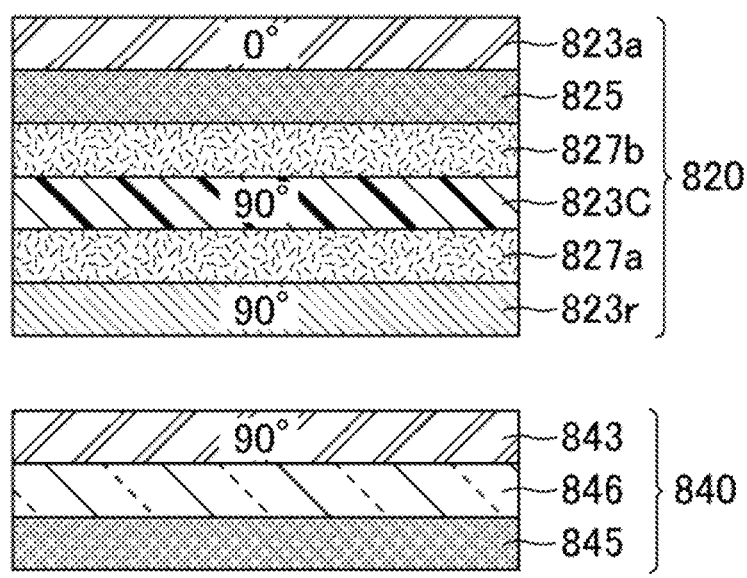
FIG. 17 is a schematic cross-sectional view of a display device of Embodiment 4-1.

FIG. 17 is a schematic cross-sectional view of a display device of Embodiment 4-1. The display device of Embodiment 4-1 has the same configuration as that of Embodiment 2-1 except that the liquid crystal display panel of the display device of Embodiment 2-1 is replaced by an organic EL display panel. Embodiment 4-1 relates to an organic EL display device that includes an organic EL display panel 840 and a transflective reflector 820 including a reflective polarizer 823r, a color polarizer 823C, a liquid crystal panel 825 for switching, and an absorptive polarizer 823a. The organic EL display device of Embodiment 4-1 has the same principles, effects, and the like as the display device of Embodiment 2-1. Since the transflective reflector 820 includes no light diffusing layer, the display surface provides a specular surface with a metallic texture. In addition, using a liquid crystal panel for switching for the organic EL display device of Embodiment 4-1 can reduce light reflection around the display device in the display state, thereby achieving an effect of improving the contrast ratio of display. The organic EL display device of Embodiment 4-1 is particularly effective when applied to mobile devices used in bright places, such as smartphones, tablet PCs, and notebook PCs (laptop PCs).

Embodiment 4-2

Embodiment 4-2 relates to an organic EL display device that includes an organic EL display panel and a transflective reflector including a reflective polarizer, a light diffusing adhesive layer, a color polarizer, a liquid crystal panel for switching, and an absorptive polarizer. The organic EL display device of Embodiment 4-2 has the same configuration as that of the organic EL display device of Embodiment 4-1 except that the adhesive layer 827a of the display device of Embodiment 4-1 shown in FIG. 17 is replaced by a light diffusing adhesive layer as a light diffusing layer. The display device of Embodiment 4-2 provides a display surface with a mat texture because the transflective reflector includes a light diffusing adhesive layer as a light diffusing layer. The light diffusing layer is preferably a polarized light diffusing layer.

Comparative Embodiment 1

Figure 18:
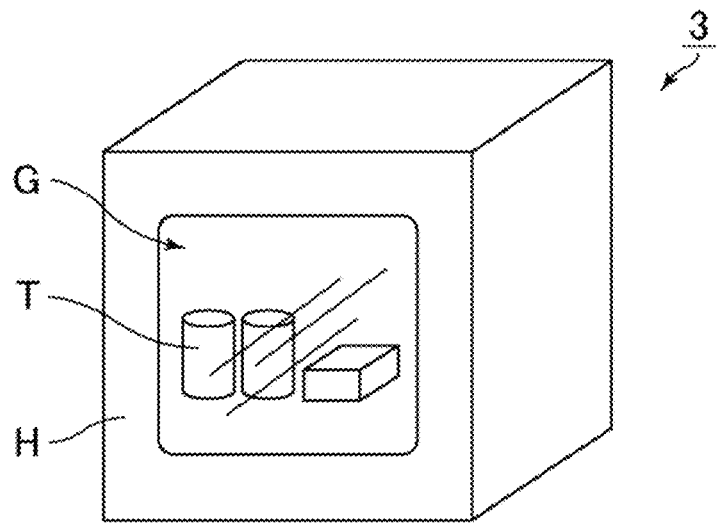
FIG. 18 is a three-dimensional schematic view of an electrical apparatus of Comparative Embodiment 1.

FIG. 18 is a three-dimensional schematic view of an electrical apparatus of Comparative Embodiment 1. For example, in an electrical apparatus 3 such as a refrigerator, a glass window G is attached to the door of a case H such that inside contents T can be checked without opening the door. Unfortunately, in these cases, the contents T are always visible, that is, there is no choice between the states of the contents T being visible and invisible. In order to solve this problem, a half mirror replaces the glass window G of the door in some cases. In a refrigerator with the half mirror, the contents T are visible when lighting disposed inside the refrigerator is turned on while the contents T are invisible when the lighting is turned off. However, diversity of design has produced various cases for refrigerators and colored half mirrors have been required. Unfortunately, if a half mirror is colored by coating or the like in red, for example, the contents also have a reddish look when the lighting in the refrigerator is turned on. In order to avoid this, the color of the half mirror has been limited to white (achromatic color).

Embodiment 5-1

Figure 19:
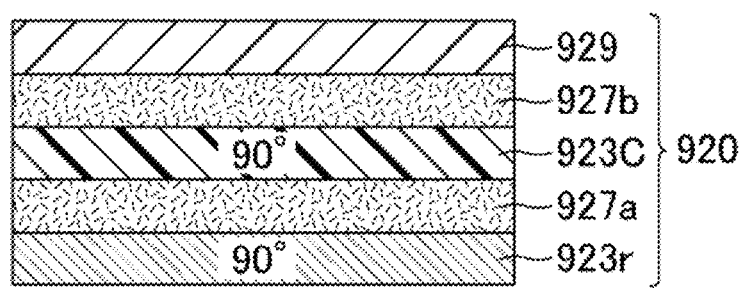
FIG. 19 is a schematic cross-sectional view of a transflective reflector of Embodiment 5-1.
Figure 20:
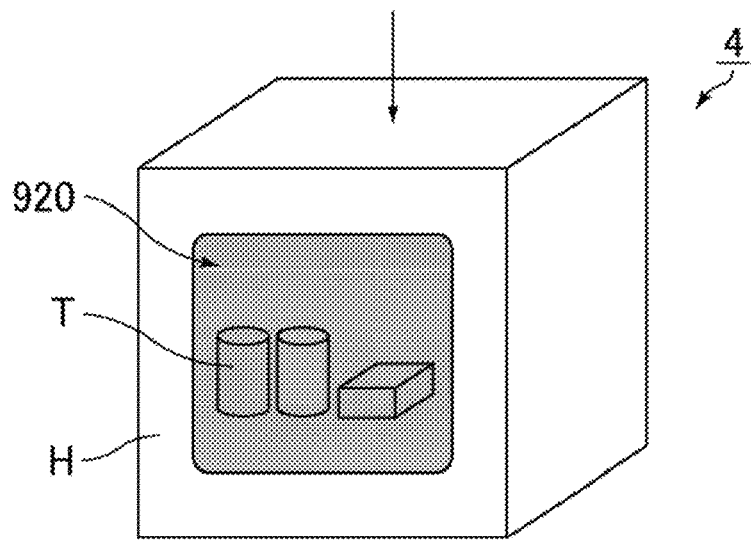
FIG. 20 is a three-dimensional schematic view of the electrical apparatus of Embodiment 5-1.
Figure 21:
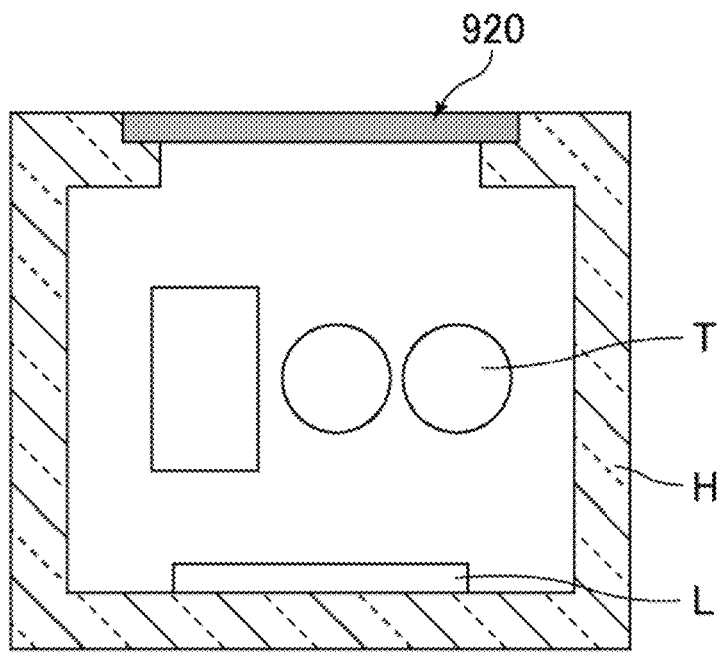
FIG. 21 is a schematic top view of the electrical apparatus of Embodiment 5-1.

FIG. 19 is a schematic cross-sectional view of a transflective reflector of Embodiment 5-1. FIG. 20 is a three-dimensional schematic view of the electrical apparatus of Embodiment 5-1. FIG. 21 is a schematic top view of the electrical apparatus of Embodiment 5-1. Embodiment 5-1 relates to a transflective reflector 920 including a reflective polarizer 923r, a color polarizer 923C, and a front surface plate 929. Embodiment 5-1 also relates to an electrical apparatus 4 including inside lighting L, a case H as a dark room, and the transflective reflector 920. In the electrical apparatus 4 of Embodiment 5-1, the transflective reflector 920 includes no light diffusing layer and thus the display surface provides a specular surface with a metallic texture.

The transflective reflector 920 of Embodiment 5-1 is proposed for solving the above problem. The transflective reflector 920, including the reflective polarizer 923r, the color reflector 923C, and the front surface plate 929, reflects certain polarized light and transmits polarized light vibrating in the perpendicular direction to the certain polarized light. The transflective reflector 920 is attached to a member such as a door of the case H. The case H is sealed and is a dark room. The case H is provided with the lighting L inside. Since the members of Embodiment 5-1 are the same as those of Embodiment 1-1, the description thereof is omitted.

Figure 22:
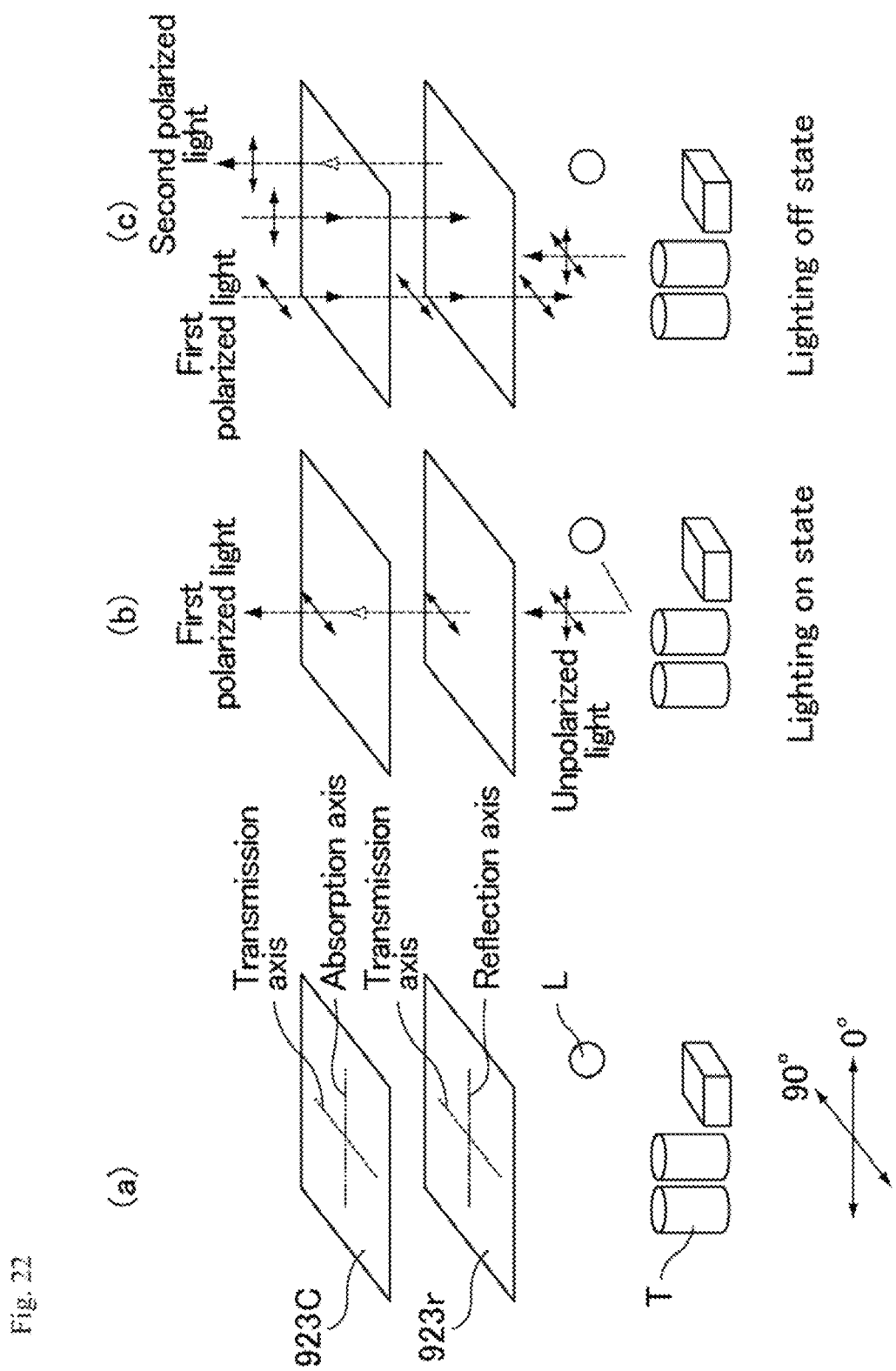
FIG. 22(a) is a drawing for illustrating the configuration of the electrical apparatus of Embodiment 5-1.
FIG. 22(b) is an explanatory view showing the operation principle of the contents display state of the electrical apparatus of Embodiment 5-1.
FIG. 22(c) is an explanatory view showing the operation principle of the no-contents display state of the electrical apparatus of Embodiment 5-1.

FIG. 22(a) is a drawing for illustrating the configuration of the electrical apparatus of Embodiment 5-1. FIG. 22(b) is an explanatory view showing the operation principle of the contents display state of the electrical apparatus of Embodiment 5-1. FIG. 22(c) is an explanatory view showing the operation principle of the no-contents display state of the electrical apparatus of Embodiment 5-1. In the lighting on state, the reflective polarizer 923r transmits only polarized light that vibrates in the 90° direction (in the direction parallel to the transmission axis direction of the reflective polarizer 923r) and has been reflected in the unpolarized state after irradiating the contents T. The light passes through the color polarizer 923C with little loss and thus undergoes no tinge change, which allows checking of the contents T. In the lighting off state, the color polarizer 923C transmits almost all the components of linearly polarized light that is incident on the transflective reflector from the viewer side, vibrates in the 0° direction, and has a certain wavelength (in FIG. 22(c), shown as second polarized light) (the color polarizer 923C transmits only light with a certain wavelength and absorbs light with other wavelengths, whereby the transmitted light is colored). The light is then reflected by the reflective polarizer 923r, passes through the color polarizer 923C again, and is emitted to the viewer side. In the lighting off state, first polarized light incident on the transflective reflector from the viewer side passes through the color polarizer 923C and the reflective polarizer 923r and then irradiates the contents T. The reflected light has a disordered polarization state which is close to the unpolarized state. Thus, quite a small amount of light is reflected to pass through the reflective polarizer 923r again. Accordingly, in the lighting off state, the contents T are invisible unless the outside environment is considerably bright.

Embodiment 5-2

Figure 23:
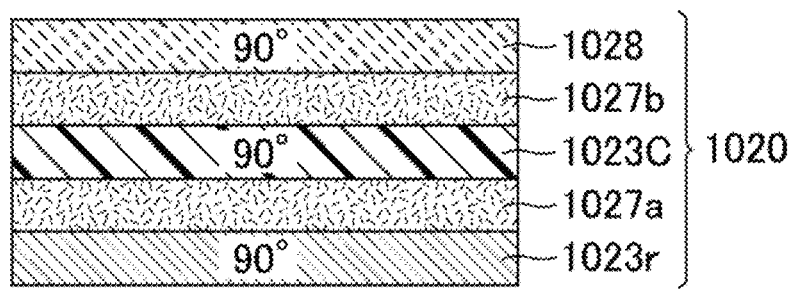
FIG. 23 is a schematic cross-sectional view of a transflective reflector of Embodiment 5-2.

The following is description of Embodiment 5-2 that achieves a display surface with a more mat texture and less reflection than the electrical apparatus of Embodiment 5-1 in the non-display state. FIG. 23 is a schematic cross-sectional view of a transflective reflector of Embodiment 5-2. Embodiment 5-2 relates to a transflective reflector 1020 including a reflective polarizer 1023r, a color polarizer 1023C, and a polarized light diffusion sheet 1028. Embodiment 5-1 also relates to an electrical apparatus including inside lighting, a case as a dark room, and the transflective reflector 1020. The electrical apparatus of Embodiment 5-2 provides a display surface with a mat texture because the transflective reflector includes the polarized light diffusion sheet 1028. When a mat texture is desired, use of a polarized light diffusing layer such as the polarized light diffusion sheet 1028 is preferred as mentioned. Although a typical isotropic light diffusing layer may be used, such a diffusing layer also diffuses light having passed through the color polarizer in the lighting on state, which may blur the contents.

Figure 24:
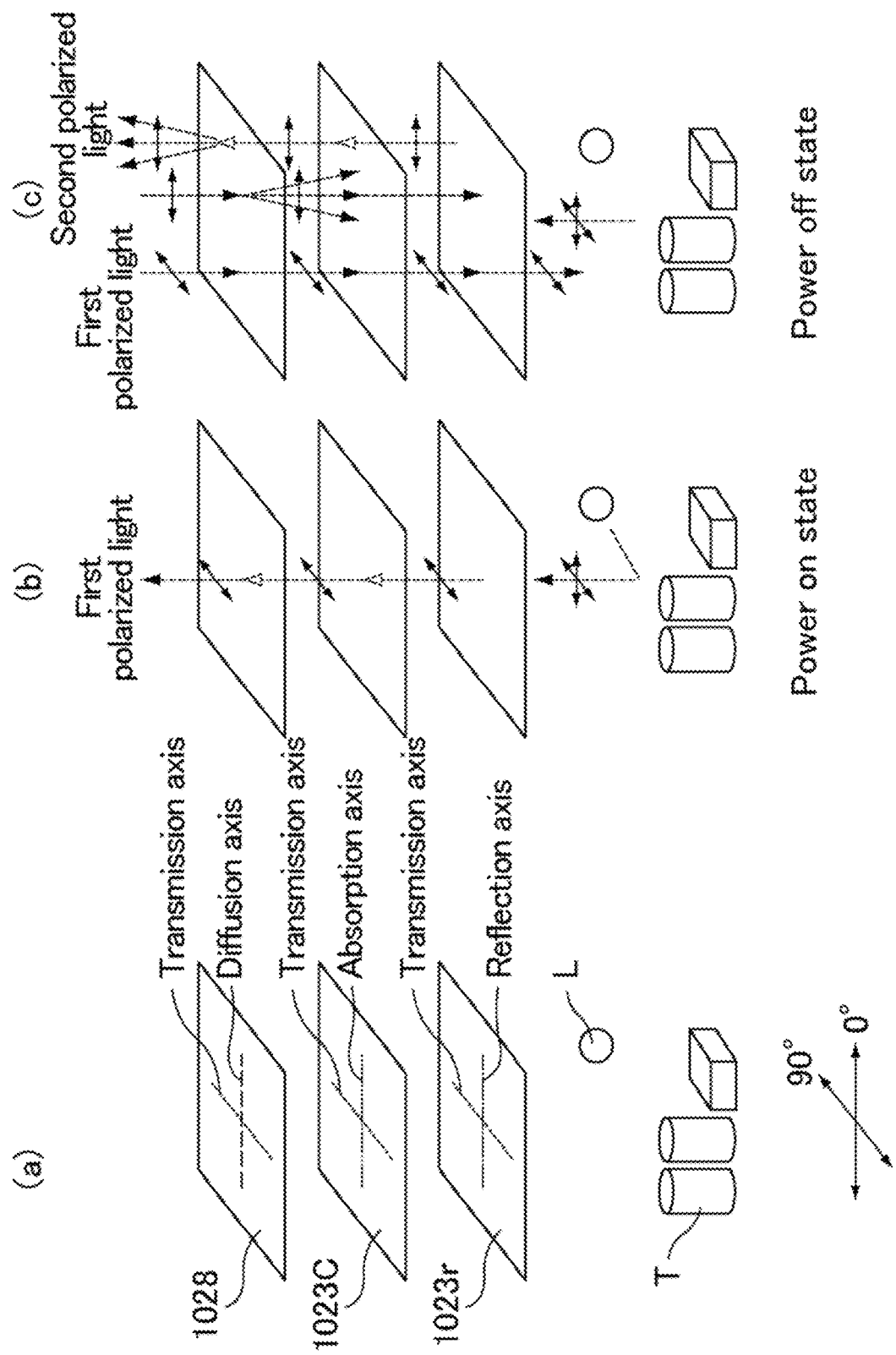
FIG. 24(a) is a drawing for illustrating the configuration of an electrical apparatus of Embodiment 5-2.
FIG. 24(b) is an explanatory view showing the operation principle of the contents display state of the electrical apparatus of Embodiment 5-2.
FIG. 24(c) is an explanatory view showing the operation principle of the no-contents display state of the electrical apparatus of Embodiment 5-2.

FIG. 24(a) is a drawing for illustrating the configuration of the electrical apparatus of Embodiment 5-2. FIG. 24(b) is an explanatory view showing the operation principle of the contents display state of the electrical apparatus of Embodiment 5-2. FIG. 24(c) is an explanatory view showing the operation principle of the no-contents display state of the electrical apparatus of Embodiment 5-2. In the lighting on state, the reflective polarizer 1023r transmits only polarized light that vibrates in the 90° direction (in the direction parallel to the transmission axis direction of the reflective polarizer 1023r) and has been reflected in the unpolarized state after irradiating the contents T. The light passes through the color polarizer 1023C and the polarized light diffusion sheet 1028 with little loss and thus undergoes no tinge change, which allows checking of the contents T. In the lighting off state, linearly polarized light that is incident on the transflective reflector from the viewer side and vibrates in the 0° direction (in FIG. 24(c), shown as second polarized light) is strongly diffused by the polarized light diffusion sheet 1028 whose transmission axis is set to 90°, i.e., whose diffusion axis is set to 0°. The light is then incident on the reflective polarizer 1023C as diffused light, is mostly reflected by the reflective polarizer 1023r, is diffused by the polarized light diffusion sheet 1028 again, and is emitted to the viewer side. In the lighting off state, first polarized light incident on the transflective reflector from the viewer side passes through the polarized light diffusion sheet 1028, the color polarizer 1023C, and the reflective polarizer 1023r and then irradiates the contents T. The reflected light has a disordered polarization state which is close to the unpolarized state. Thus, quite a small amount of light is reflected to pass through the reflective polarizer 1023r again. Thus, in the lighting off state of the electrical apparatus of Embodiment 5-2, the contents T are invisible unless the outside environment is considerably bright, and the display surface appears to have a (chromatic) color. The electrical apparatus of Embodiment 5-2 in the lighting off state provides a display surface with a diffuse reflection surface, and thus tends to match interiors and a case housing the display device having diffuse reflection surfaces.

Implementation of Embodiment 5-1 and Embodiment 5-2 achieves switching between the contents in the case as a dark room being visible and invisible. In the state where the contents are visible, the contents are sufficiently prevented from appearing with unnecessary tinge, which allows better checking. The electrical apparatuses of Embodiment 5-1 and Embodiment 5-2 can be suitably applied to consumer electronics such as refrigerators, washing machines, and microwave ovens.

REFERENCE SIGNS LIST 1, 101: Display device
2: Electronic apparatus
3, 4: Electrical apparatus
10, 110, 210, 310, 410, 510, 610: Liquid crystal display panel
11, 111, 211, 611: Backlight
13a, 13b, 113a, 113b, 213a, 213b, 313a, 313b, 613a, 613b, 623a, 743, 823a, 843: Absorptive polarizer
15, 115, 215, 615: Liquid crystal cell
20, 120, 220, 320, 420, 520, 620, 720, 820, 920, 1020: Transflective reflector
23C, 123C, 223C, 323C, 423C, 523C, 623C, 723C, 823C, 923C, 1023C: Color polarizer
23r, 123r, 223r, 323r, 423r, 523r, 623r, 723r, 823r, 923r, 1023r: Reflective polarizer
27a, 27b, 127a, 127b, 227b, 237, 337, 437, 537, 627a, 627b, 727a, 727b, 827a, 827b, 927a, 927b, 1027a, 1027b: Adhesive layer
29, 229, 329, 429, 529, 629, 729, 929: Front surface plate
227d: Light diffusing adhesive layer
128: Light diffusion sheet
332: Antireflection layer
434: Transparent resin
740, 840: Organic EL display panel
745, 845: Organic EL cell
746, 846: Retarder
625, 825: Liquid crystal panel for switching
1028: Polarized light diffusion sheet
BM: Light-shielding layer
G: Glass window
H: Case
L: (Inside) Lighting
T: Contents
RL: Reflective layer

The invention claimed is:
1. A display device comprising:
a display panel; and
a transflective reflector disposed on a viewing surface side of the display panel,
the transflective reflector including a reflective polarizer and a color polarizer disposed on a side closer to the viewing surface than the reflective polarizer,
wherein the transflective reflector further includes a light diffusing layer on a side closer to the viewing surface than the reflective polarizer, and the light diffusing layer is a light diffusing adhesive layer and/or a light diffusion sheet, and
the light diffusing layer is a polarized light diffusing layer whose diffusion axis is parallel to the reflection axis of the reflective polarizer.
2. The display device according to claim 1,
wherein the transflective reflector satisfies a proportion of a minimum reflectance to a maximum reflectance in a wavelength band from 400 to 700 nm of 5% to 96%.
3. The display device according to claim 1,
wherein the transflective reflector in a plan view has a reflectance and/or a chromaticity changing in one direction in a wavelength band from 400 to 700 nm.
4. The display device according to claim 1,
wherein the display device includes a light-shielding layer in a frame region on a back surface side of the reflective polarizer.

5. The display device according to claim 1,
wherein the display device includes an antireflection film on at least one selected from a back surface of the transflective reflector and a viewing surface of the display panel.

6. The display device according to claim 1,
wherein the display device includes a transparent resin filling a space between the transflective reflector and the display panel.

7. The display device according to claim 1,
wherein the display device includes a reflective layer in the frame region on the back surface side of the reflective polarizer.

8. The display device according to claim 7,
wherein the reflective layer has a reflectance in a wavelength band from 400 to 700 nm falling within a range of 1% to 10%.

9. The display device according to claim 1,
wherein the transflective reflector further includes a switching portion on a side closer to the viewing surface than the reflective polarizer, and
the switching portion is configured to be switchable between a state of transmitting light from the viewing surface side of the display device to the display panel and a state of not transmitting light from the viewing surface side of the display device to the display panel.

10. An electronic apparatus comprising the display device according to claim 1.

11. The electronic apparatus according to claim 10,
wherein the electronic apparatus further includes a chromatic case housing the display device, and
the chromatic case and the transflective reflector have a color difference ΔE of 0 or more and 6.5 or less.

* * * * *